(12) United States Patent
Michaelsen

(10) Patent No.: US 7,346,160 B2
(45) Date of Patent: Mar. 18, 2008

(54) RANDOMIZATION-BASED ENCRYPTION APPARATUS AND METHOD

(76) Inventor: David L. Michaelsen, 1925 N. 1000 East, North Logan, UT (US) 84341

( * ) Notice: Subject to any disclaimer, the term of this patent is extended or adjusted under 35 U.S.C. 154(b) by 719 days.

(21) Appl. No.: 10/829,654

(22) Filed: Apr. 22, 2004

(65) Prior Publication Data

US 2005/0002531 A1 Jan. 6, 2005

Related U.S. Application Data

(60) Provisional application No. 60/464,707, filed on Apr. 23, 2003.

(51) Int. Cl.
*H04L 9/00* (2006.01)
*H04K 1/00* (2006.01)
(52) U.S. Cl. .................... 380/28; 380/42; 380/255
(58) Field of Classification Search ............ 380/28, 380/255, 42
See application file for complete search history.

(56) References Cited

U.S. PATENT DOCUMENTS

| | | |
|---|---|---|
| 4,484,027 A | 11/1984 | Lee et al. |
| 4,853,962 A | 8/1989 | Brockman |
| RE33,189 E | 3/1990 | Lee et al. |
| 4,997,288 A | 3/1991 | Rosenow |
| 5,008,936 A | 4/1991 | Hamilton et al. |
| 5,016,277 A | 5/1991 | Hamilton |
| 5,022,076 A | 6/1991 | Rosenow et al. |
| 5,063,596 A | 11/1991 | Dyke |
| 5,128,996 A | 7/1992 | Rosenow et al. |
| 5,175,766 A | 12/1992 | Hamilton |
| 5,297,207 A | 3/1994 | Degele |
| 5,412,729 A | 5/1995 | Liu |
| 5,452,358 A | 9/1995 | Normile et al. |
| 5,479,513 A | 12/1995 | Protopopescu et al. |
| 5,539,827 A | 7/1996 | Liu |
| 5,548,648 A | 8/1996 | Yorke-Smith |
| 5,623,548 A | 4/1997 | Akiyama et al. |
| 5,675,652 A | 10/1997 | Coppersmith et al. |
| 5,675,653 A | 10/1997 | Nelson, Jr. |
| 5,724,427 A | 3/1998 | Reeds, III |

(Continued)

OTHER PUBLICATIONS

Data obfuscation: anonymity and desensitization of usable data sets Bakken, D.E.; Rarameswaran, R.; Blough, D.M.; Franz, A.A.; Palmer, T.J.; Security & Privacy Magazine, IEEE vol. 2, Issue 6, Nov.-Dec. 2004 pp. 34-41.*

(Continued)

*Primary Examiner*—David Y Jung
(74) *Attorney, Agent, or Firm*—Pate Pierce & Baird

(57) ABSTRACT

A method for encryption data subdivided into segments of random lengths. A data source having a state corresponding to initialization parameters and the number of patterns output therefrom provides for a reversible encryption process. Decryption is accomplished by repeating encryption using a data source having an identical initial state. The data source consists random pattern generation machines (RPGMs). A portion of RPGMs may each contain patterns of a different length. Randomly selecting an RPGM and outputting a pattern therefrom effectively provides a pattern of random length. The data source may output patterns interpreted to govern the behavior of obfuscation operations. Patterns output from the data source may be interpreted as instructions as to what obfuscation to perform and what parameters shall define the obfuscation.

16 Claims, 31 Drawing Sheets

U.S. PATENT DOCUMENTS

| | | |
|---|---|---|
| 5,724,428 A | 3/1998 | Rivest |
| 5,825,882 A | 10/1998 | Kowalski et al. |
| 5,835,597 A | 11/1998 | Coppersmith et al. |
| 5,983,252 A | 11/1999 | Clapp |
| 5,995,624 A | 11/1999 | Fielder et al. |
| 6,014,446 A | 1/2000 | Finkelstein |
| 6,108,421 A | 8/2000 | Kurdziel et al. |
| 6,252,958 B1 | 6/2001 | Rose |
| 6,266,413 B1 | 7/2001 | Shefi |
| 6,304,657 B1 | 10/2001 | Yokota et al. |
| 6,321,201 B1 | 11/2001 | Dahl |
| 6,415,032 B1 | 7/2002 | Doland |
| 6,445,794 B1 | 9/2002 | Shefi |
| 6,463,150 B1 | 10/2002 | Moldovyan et al. |
| 6,490,357 B1 | 12/2002 | Rose |
| 6,510,228 B2 | 1/2003 | Rose |
| 6,535,980 B1 | 3/2003 | Kumar et al. |
| 6,560,338 B1 | 5/2003 | Rose et al. |
| 6,782,101 B1 | 8/2004 | Huntress |
| 6,782,473 B1 | 8/2004 | Park |
| 6,785,388 B1 | 8/2004 | Kasahara et al. |
| 6,788,787 B1 | 9/2004 | Shono et al. |
| 6,788,788 B1 | 9/2004 | Kasahara et al. |
| 6,792,108 B1 | 9/2004 | Patera et al. |
| 6,810,407 B1 | 10/2004 | Jaques et al. |
| 6,820,198 B1 | 11/2004 | Ross |
| 6,823,068 B1 | 11/2004 | Samid |

OTHER PUBLICATIONS

Conference on Computer and Communications Security; Proceedings of the 12th ACM conference on Computer and communications; Alexandria, VA, USA; SESSION: Privacy and anonymity; pp. 102-111 Year of Publication: 2005.*

On the impossibility of obfuscation with auxiliary input Goldwasser, S.; Yael Tauman Kalai; Foundations of Computer Science, 2005. FOCS 2005. 46th Annual IEEE Symposium on Oct. 23-25, 2005 pp. 553-562.*

Analysis of the statistical cipher feedback mode of block ciphers Heys, H.M.; Computers, IEEE Transactions on vol. 52, Issue 1, Jan. 2003 pp. 77-92.*

Protection against indirect overflow attacks on pointers Zhu, G.; Tyagi, A.; Information Assurance Workshop, 2004. Proceedings. Second IEEE International 2004 pp. 97-106.*

Hardware and Binary Modificaiton Support for Code Pointer Protection From Buffer Overflow Tuck, N.; Calder, B.; Varghese, G.; Microarchitecture, 2004. MICRO-37 2004. 37th International Symposium on Dec. 4-8, 2004 pp. 209-220.*

* cited by examiner

| RPGM Record | 218 |
|---|---|
| RPGM ID | 220 |
| Starting AHBP Address | 222 |
| Segment Count | 224 |
| Max Segment Length | 226 |
| Number of Entries | 228 |
| Bits Per Entry | 230 |
| Logical Base Information Bits Per Entry | 232 |
| RPGM LBT Address | 234 |
| Segment ID(s) | 236 |
| AHBP ID | 238 |

FIG. 12

| Segment Record | 246 |
|---|---|
| AHBP ID | 248 |
| Segment Number | 250 |
| Segment Address | 252 |
| Segment Length | 254 |
| First Entry Address | 256 |
| Entry Count | 258 |
| Entry Number of First Entry | 260 |
| Address of Last Entry | 262 |
| Last Entry Length | 264 |
| Filler Entry Length | 266 |

FIG. 13

RANDOMIZATION-BASED ENCRYPTION APPARATUS AND METHOD

RELATED APPLICATIONS

This application claims the benefit of U.S. provisional application Ser. No. 60/464,707, filed Apr. 23, 2003 and entitled RANDOM PATTERN GENERATION MACHINE.

THE FIELD OF THE INVENTION

The invention relates generally to data encryption methods and more particularly to encryption using random patterns.

BACKGROUND

The process of encrypting data typically includes transforming a message into an encrypted state, transmitting the encrypted message to a second party, and decrypting the encrypted data to recover the original message. Such systems typically rely on a key known by both the sender and the recipient to decrypt the message.

The key known to both parties may be used as a parameter interpreted by a complex algorithm in order to encrypt or decrypt the data. The algorithm is typically made extremely computationally intense in order to ensure that an unintended recipient of the data cannot readily decrypt the message. However, such systems by definition require large amounts of computation and a corresponding delay in the process of transmitting messages.

Prior encryption systems typically process a message using one of two methods. In the first methods, a message may be divided into equally sized blocks and each block encrypted. The encryption of one block may depend in part on the data contained in a previous block. In a second method, rather than dividing the message into blocks the message is processed as a single string of data. Both methods provide predictability to unintended recipients. An unintended recipient may rely on the fact that the blocks will have a uniform length or that the entire message is processed as a single string of data.

Prior systems also typically apply a fixed algorithm, which, though computationally complex, does not vary significantly dynamically with each encryption. That is to say, the process of obfuscating a message proceeds through defined steps which are difficult to undo, but which are nonetheless the product of a fixed method. Some systems may vary the algorithm depending on the value of the key or the text being encrypted. However, the algorithm is not independent variable.

What is needed is an encryption method that provides reduced computational complexity and greater unpredictability to potential unintended recipient.

It would be a further advancement to provide an encryption method dividing a message into differently sized blocks, or message segments, subject to independent manipulation in order to increase the difficulty of decryption for unintended recipients.

It would be a further advancement in the art to provide an encryption method dynamically determining both which obfuscation operation will be performed and the parameters which will govern the obfuscation operations independent from a key or the encrypted text.

BRIEF SUMMARY OF THE INVENTION

In view of the foregoing, the present invention to provides a method and apparatus for encrypting data that reduces computational complexity and increases variability of the encryption process by encrypting blocks of data having random lengths and by dynamically determining the obfuscation performed.

A source of random data may be provided. The source of data may have the property of having a state that can be initialized and which changes each time the data source outputs data. In one embodiment, the data source is a random pattern generation machine (RPGM) having a table of random patterns and a logical base. The logical base may be combined with an offset or other data to indicate which pattern is to be output by the RPGM. After outputting a pattern, the logical base may be advanced according to a specified rule, or may be advanced randomly. That is to say, the rule that is used to advance the logical base may change from one access of the RPGM to another. Use of tables provides for a large number of possible encryption parameters that must be tried by an unintended recipient in order to decrypt while still allowing computationally simple encryption through table look-ups.

Encryption of data may be accomplished several ways by substituting for clear text a pattern output from a first data source or by using data provided by the data source to modify the clear text pattern. The pattern may correspond to the state of the data source and the clear text. For example, an RPGM may output a pattern from its table corresponding to the combination of the logical base and the clear text. The pattern output will be transmitted as the encrypted text or may be used to modify the clear text, for example, through an exclusive or operation.

Decryption of the data may be accomplished by initializing a second, identical RPGM, to the same initial state as the first RPGM. The encrypted text and logical base may then be analyzed to determine which value of clear text would cause the RPGM to yield the encrypted text or may be used to reverse an original modification.

A message may be divided into segments having differing lengths. For example, a message segment having a length of 556 bytes read from the message. The process of encryption may include determining a segment length, reading a segment of that length from a message, encrypting the segment, determining a second segment length, reading a second segment of that length from the message, encrypting the second segment, and so forth for the entire message.

The length of the segments and the encrypted text substituted therefore may be output by the above mentioned data source having a state dependent on the number of times it is accessed. In this manner, the process of decryption may be accomplished by repeating the steps of generating segment lengths and substituting text to maintain the data source in a consistent state.

In some embodiments a selection RPGM is accessed to output a pattern indicating the length of a segment. The length of the segment may also indicate a cipher text RPGM to access for a substitute pattern. In this manner, segments of random lengths may be output by randomly selecting among RPGMs each containing patterns of a different length.

Substitute patterns output by the data source may be subjected to further obfuscation operations. Both the identity and the number of obfuscations performed may be determined automatically. The data source may be accessed to obtain a code indicating the function to be performed. In a like manner, random patterns output from the data source may be evaluated to determine whether to perform a function. In some embodiments, a segment may be further subdivided, with dynamically determined obfuscations being performed on the subsegments. The length of the subsegments may likewise be determined by accessing the data source.

In an alternative embodiment, a message is divided into segments. The length of the segments may be determined by a number output from the data source. The segment may be further divided into bit patterns of random length. The length of a bit pattern may likewise be determined by a pattern output from the data source. Each bit pattern may be substituted with a value from the data source. The substituted values may then be stored in a buffer. Bit patterns of random length may be read from the input buffer and subject to obfuscation operations and the obfuscated bits written back to the input buffer. The contents of the in-process buffer is then written to an output store for transmission.

As with other operations in accordance with the invention, accessing patterns from the data source to control obfuscation operations changes the state of the data source. Thus obfuscation operations may be undone for purposes of decryption by repeating the steps of accessing the data source and recording parameters needed to undo the obfuscation process. By repeating identically steps that change the state of the data source, the process of encryption can be repeated to determine information needed to decrypt a message

BRIEF DESCRIPTION OF THE DRAWINGS

The operation and functionality of the invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

FIG. 12 is a schematic block diagram of a RPGM record, in accordance with the invention;

FIG. 13 is a schematic block diagram of a segment record, in accordance with the invention;

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of the system and method of the present invention, as represented in FIGS. 1 through 41, is not intended to limit the scope of the invention, as claimed, but it is merely representative of the presently preferred embodiments of the invention.

The presently preferred embodiments of the invention will be best understood by reference to the drawings, wherein like parts are designated by like numerals throughout.

Those of ordinary skill in the art will, of course, appreciate that various modifications to the details illustrated in the schematic diagrams of FIGS. 1 through 41 may easily be made without departing from the essential characteristics of the invention.

Thus, the following description is intended only as an example, and simply illustrates one presently preferred embodiment consistent with the invention as claimed herein.

Figure 1:
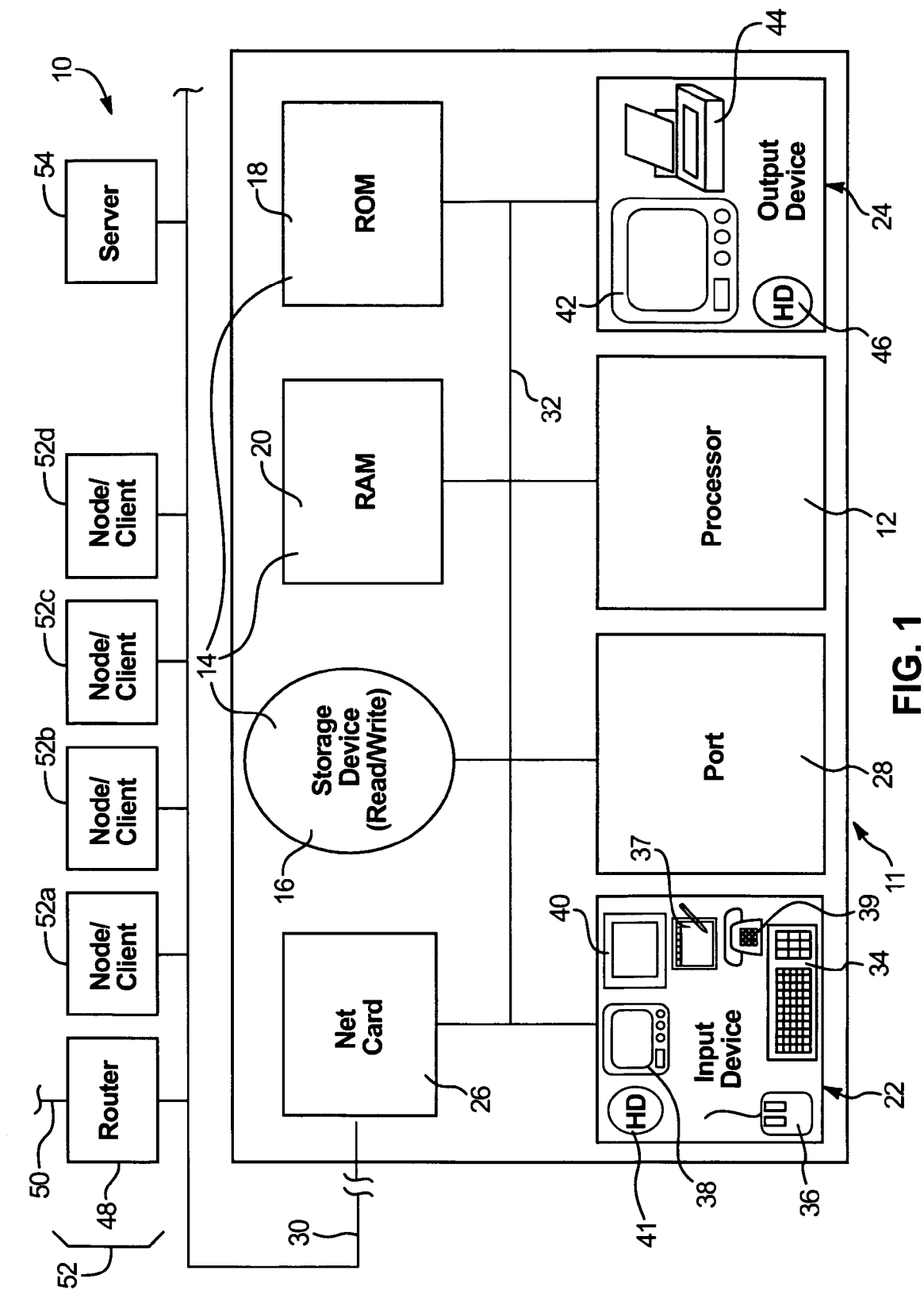
FIG. 1 is a schematic block diagram of one architecture for a hardware suite suitable for implementing an apparatus in accordance with the invention.

Referring to FIG. 1, an apparatus 10 may include a node 11 (client 11, computer 11) containing a processor 12 or CPU 12. The CPU 12 may be operably connected to a memory device 14. A memory device 14 may include one or more devices such as a hard drive 16 or non-volatile storage device 16, a read-only memory 18 (ROM) and a random-access (and usually volatile) memory 20 (RAM).

The apparatus 10 may include an input device 22 for receiving inputs from a user or another device. Similarly, an output device 24 may be provided within the node 11, or accessible within the apparatus 10. A network card 26 (interface card) or port 28 may be provided for connecting to outside devices, such as the network 30.

Internally, a bus 32 (system bus 32) may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36. A touch screen 38, a telephone 39, or simply a telephone line 39, may be used for communication with other devices, with a user, or the like.

Similarly, a scanner 40 may be used to receive graphical inputs which may or may not be translated to other character formats. A hard drive 41 or other memory device 14 may be used as an input device whether resident within the node 11 or some other node 52 (e.g., 52, 58, etc.) on the network 30, or from another network 50.

Output devices 24 may likewise include one or more physical hardware units. For example, in general, the port 28 may be used to accept inputs and send outputs from the node 11. Nevertheless, a monitor 42 may provide outputs to a user for feedback during a process, or for assisting two-way communication between the processor 12 and a user. A printer 44 or a hard drive 46 may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 may have various communication capabilities.

In certain embodiments, a minimum of logical capability may be available in any node 52. Note that any of the individual nodes 52 may be referred to, as may all together, as a node 52 or nodes 52.

A network 30 may include one or more servers 54. Servers may be used to manage, store, communicate, transfer, access, update, and the like, any number of files for a network 30. Typically, a server 54 may be accessed by all nodes 11, 52 on a network 30. Nevertheless, other special functions, including communications, applications, and the like may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components of the apparatus 10 may need to communicate data with one another. A communication link may exist, in general, between any pair of devices or components.

By the expression "nodes" 52 is meant any one or all of the nodes 48, 52, 54, 56, 58, 60, 62, 11. Thus, any one of the nodes 52 may include any or all of the component parts illustrated in the node 11.

The directory services node 60 provides the directory services as known in the art.

Accordingly, the directory services node 60 hosts the software and data structures required for providing directory services to the nodes 52 in the network 30 and may do so for other nodes 52 in other networks 50.

The directory services node 60 may typically be a server 54 in a network. However, it may be installed in any node 52. To support directory services, a directory services node 52 may typically include a network card 26 for connecting to the network 30, a processor 12 for processing software commands in the directory services executables, a memory device 14 for operational memory as well as a non-volatile storage device 16 such as a hard drive 16. Typically, an input device 22 and an output device 24 are provided for user interaction with the directory services node 60.

In general, any number of workstation nodes 58, 62 may exist in a network 30, within some practical limit. Any network 30, 50 may be part of, and connect to the Internet 72.

Figure 2:
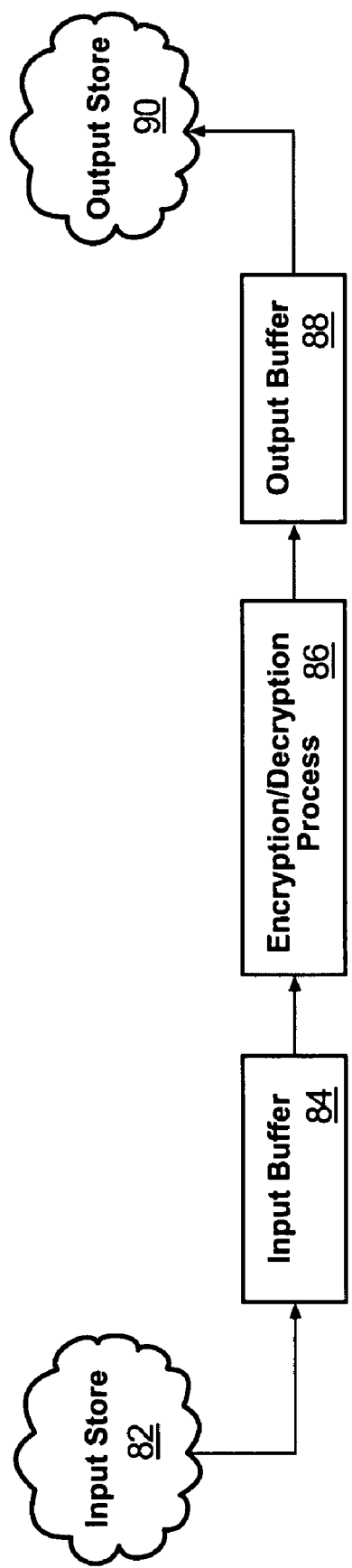
FIG. 2 is a process flow diagram of a process for encrypting and decrypting messages, in accordance with the invention.

Referring now to FIG. 2 while continuing to refer to FIG. 1, a node 52 may executed the illustrated process to encrypt or decrypt data in an input store 82 stored in the memory 14. The data in the input store 82 may be read into an input buffer 84. The input store 84 may be embodied as volatile memory, on on-board cache on a CPU, or like memory device. The contents of the input buffer 84 then undergoes an encryption or decryption process 86, which will convert the contents of input buffer 84 into either encrypted or decrypted data. Encrypted or decrypted data may then be written to an output buffer 88. The contents of the output buffer 88 may be written to a an output store 90, preparatory to transmission to the recipient of the encrypted data or to an user requesting decrypted data.

Figure 3:
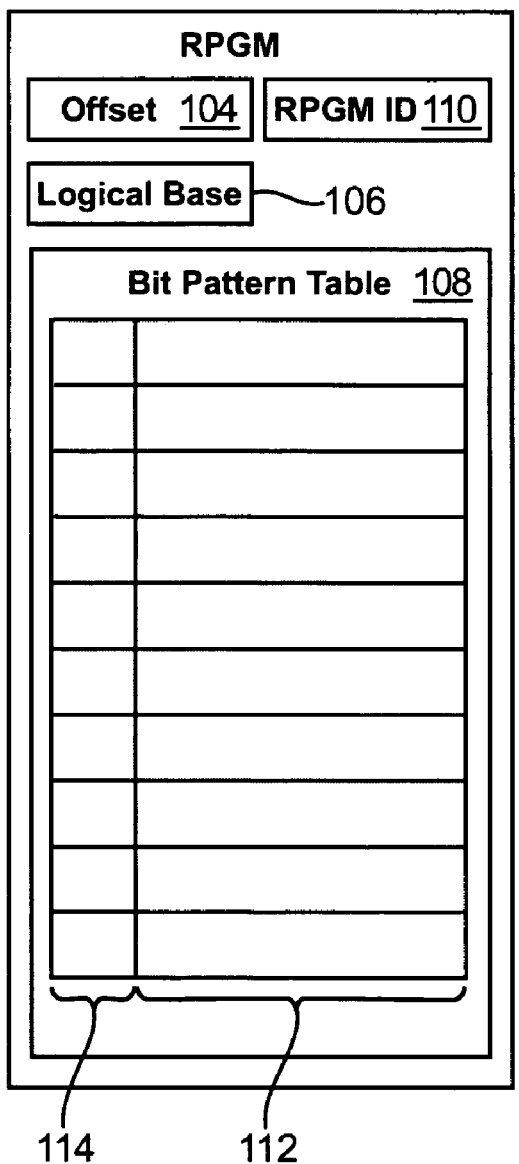
FIG. 3 is a schematic block diagram of a data source embodied as a Random Pattern Generation Machine (RPGM), in accordance with the invention.

Referring to FIG. 3, an encryption process 86 may make use of one or more data sources 100 having the following properties: an ability to output a bit pattern corresponding to the current state of the data source, an ability to automatically change the state of the data source after outputting a bit pattern, and the ability to provide an offset to the data source that will determine in part the number output.

In some embodiments, a data source 100 may be embodied as a random pattern generation machine (RPGM) 102. The RPGM 102 may include an offset 104, a logical base 106, a pattern table 108, and an RPGM identifier (ID) 110 forming the addressing scheme, or parameters thereof. The offset 104 may store data that will be used to determine the pattern output by the RPGM. In some embodiments, the offset 104 will be determined by the clear text that is being encrypted by the encryption process 86. The logical base 106 may represent the current state of the RPGM 102. In some embodiments the logical base 106 may be an address that is incremented after each time the RPGM is accessed to provide a random pattern. The logical base 106 may be incremented by simply adding a number, such as one, to the logical base after each access. Alternatively, a random number read from another RPGM 102, or other source of random data may be used.

A pattern table 108 may include random patterns to be returned by the RPGM 102. For example, an RPGM may include all possible bit patterns having a specified length. For example, all possible bit patterns eight bits in length (e.g. 10011011, 11110001 . . . ). The pattern table 108 may include a plurality of patterns 112, each having an index 114. In practice the index 114 may simply be the position of a pattern 112 within the table or physical location in memory of a pattern and will not be an actual value stored with the pattern table. Accessing a number from the RPGM 102 may include combining the offset 104 and the logical base 106 to obtain an index 114. The pattern 112 located at the index 114 will then be returned to a calling function or process.

The offset 104 and logical base 106 may be combined by adding them together. It will be noted that other methods of combination are possible such as subtraction or a bitwise exclusive or. It will also be noted that the combination of the offset 104 and logical base 106 may be related to a particular pattern 112 within the table 108 by other means other than simply as an index to a particular pattern 112. For example, the combined offset 104 and logical base 106 may be manipulated by a function, or the like, in order to arrive at an index 114 for a particular pattern 112.

Figure 4:
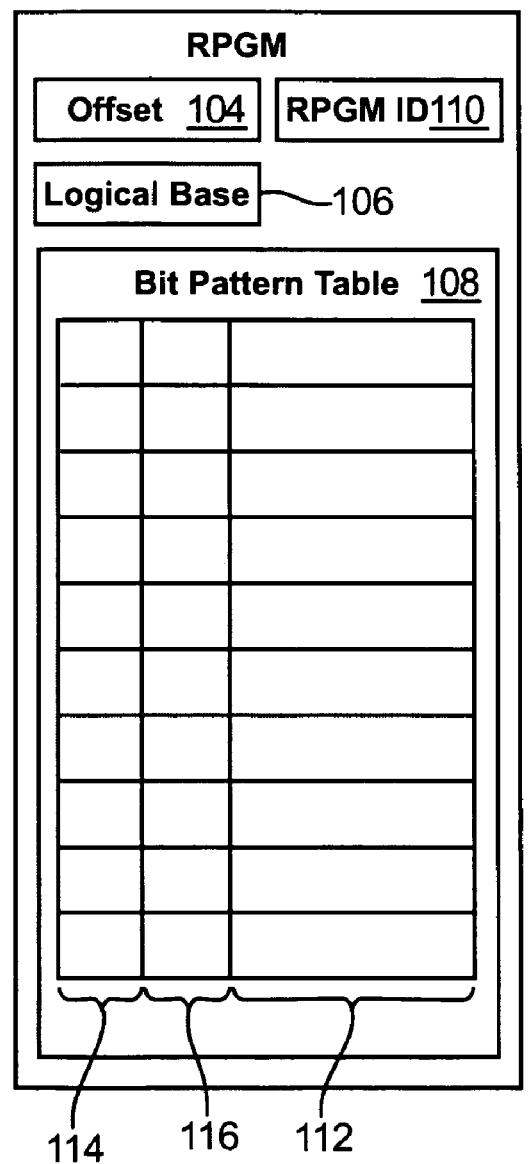
FIG. 4 is an alternative embodiment of a RPGM, in accordance with the invention.

Referring to FIG. 4, in some embodiments an RPGM may have patterns 114 having different lengths (e.g. eight bits, fifteen bits, twenty bits). Accordingly, each pattern may store a pattern length 116 for each pattern 114 in order to provide information to calling functions or processes concerning the length of the pattern 114 returned by the RPGM 102.

Figure 5:
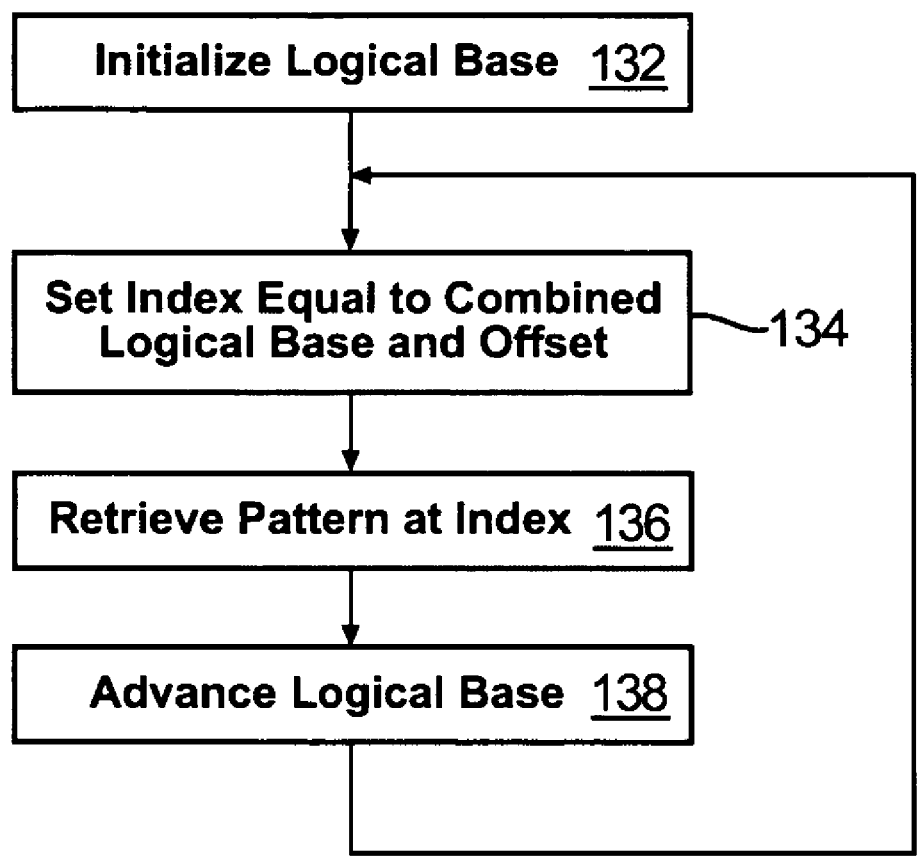
FIG. 5 is a process flow diagram of a pattern return process, in accordance with the invention.

Referring to FIG. 5, the RPGM 102 may perform, or be operated upon, by a pattern return process 130. The pattern return process 130 may include initializing 132 the logical base 106. Initializing 132 may be performed once prior to returning a series of patterns 112. For example, when encrypting a single message, the RPGM 102 may output a number of patterns 112. Accordingly, the logical base 106 may be initialized prior to encrypting the message, but not each time a pattern is output.

The process 130 may include setting 134 the index equal to the combined logical base and offset. This may include calculating an index equal to the added offset 104 and logical base 106. The process 130 may include retrieving 136 the pattern at the index calculated in step 134 for return to a calling function or process. The process 130 may include advancing 138 the logical base. Advancing 138 the logical base may include adding a fixed number to the logical base, or adding a random number retrieved from some other data source 100 to the logical base 106 or any number of other manipulations of the logical base.

Figure 6:
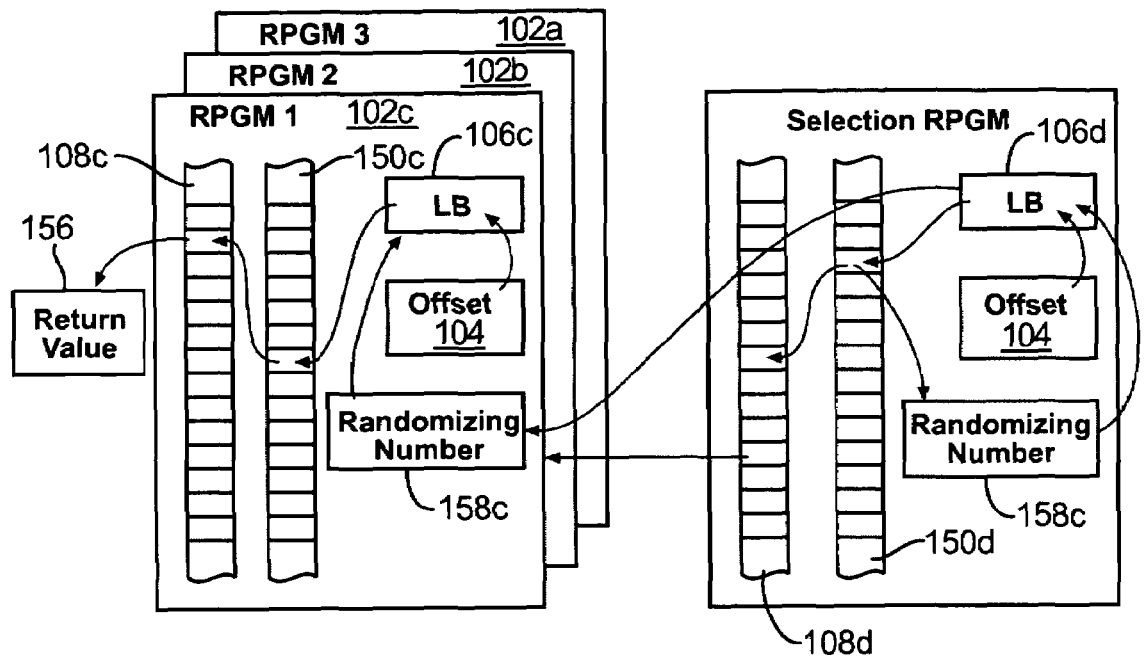
FIG. 6 is a schematic block diagram of a system of RPGMs for generating patterns of varying lengths in accordance with the invention.

Referring to FIG. 6, a plurality of RPGMs may be arranged as illustrated to return patterns 112 having varying lengths. For example, a number of RPGMs 102a-102c may each have patterns of a different lengths. Thus, for example, RPGM 102a may store patterns 112 having a length of seventeen bits, whereas RPGM 102c stored patterns 112 having a length of nine bits. A selection RPGM 102d may be provided to determine which of the RPGMs 102a-102c will be selected to return a pattern to a particular calling function or process.

The pattern table 108d may store the RPGM Identifiers 110 of the RPGMs 102a-102c in a random arrangement. Thus, the selection RPGM 102d may be first accessed to output an RPGM Identifier 110. The RPGM 102a-102c corresponding to the RPGM Identifier 110 may then be accessed to return a pattern to a calling function or process. When accessing the RPGM 102d, an offset may not be used in some embodiments. That is to say the selection RPGM 102d may simply return the pattern 112 at the index 114 corresponding to the logical base. When the chosen RPGM 102a-102c is accessed, an offset 104 may still be added to the logical base to calculate the index 114 of the pattern 112 to be returned. For RPGMs 102a-102c forming part of a system for encryption, the offset 104 may be set equal to a numeric representation of clear text which is to be encrypted.

In some embodiments, an RPGM 102a-102d may include an address table 150a-150d. The address table 150a-150d may add an intermediate level of randomization to the addressing scheme used when outputting numbers from an RPGM. For the selection RPGM 102d, the logical base 106d may point to a location 152d in the address table 150d. The value at this location may then be used to point to a location 154d within the pattern table 108d. The value at location 154d may be correspond to an RPGM 102a-102c.

The corresponding RPGM 102a-102c may likewise include an address table 150a-150c. Thus, for example, if the value at location 154d corresponded to RPGM 102c, the logical base 106c may be evaluated to determine a location 152c in address table 150c. The value at location 152c may be interpreted as a location 154c within the pattern table 108c. The value at location 154c may be output as a return value 156 to a calling function or process.

In some embodiments, the RPGMs 102a-102d may include a randomizing number 158a-158d. In some embodiments, after the selection RPGM 102d is accessed, the value at location 152d may be added to the randomizing numbers 158d and the result stored as the new randomizing number 158d. In some embodiments the value at location 152d may be added to the randomizing numbers 158a-158c as well. After an RPGM 102a-102d is accessed the randomizing number of the RPGM 102a-102d accessed may be added to the logical base 102a-102d of that RPGM 102a-1102d and stored as the new value of the logical base 102a-102d. The initial value of an RPGM may be chosen to be zero, a value retrieved from a source of random data, or the like.

It will be noted that, the randomizing numbers 158a-158d and logical bases 106a-106d will tend increase in value as the RPGMs 102a-102d are accessed. Accordingly, when the value of a randomzing numbers 158a-158d is greater than the number of entries in its corresponding address table 150a-150d (or pattern table 108a-108d for embodiments of the RPGMs 102a-102d that lack address tables 150a-150d), the randomizing number 158a-158d may be divided by the number of entries in the address table 150a-150d, or pattern table 108a-108d, and the remainder stored as the new value of the randomizing number 158a-158d.

In a like manner, when the value of a logical base 106a-106d is greater than the number of entries in its corresponding address table 150a-150d (or pattern table 108a-108d for embodiments of the RPGMs 102a-102d that lack address tables 150a-150d), the logical base 106a-106d may be divided by the number of entries in the address table 150a-150d, or pattern table 108a-108d, and the remainder stored as the new value of the logical base 106a-106d.

Figure 7:
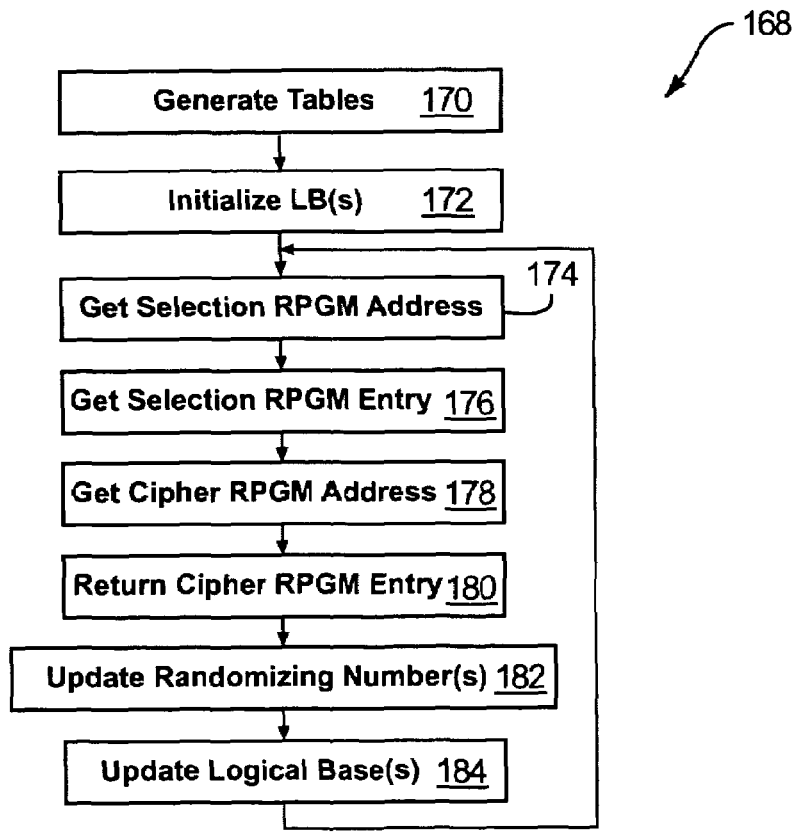
FIG. 7 is a schematic block diagram of an alternative embodiment of a pattern return process, in accordance with the invention.

Referring to FIG. 7, the process of outputting a return value 156 may be accomplished by executing the process 168. The table generating step 170 may include generating the pattern tables 108a-108d, and address tables 150a-150d (for embodiments having address tables 150a-150d). The tables 108a-108d, 150a-150d maybe generated for use in an encryption process by any means of random number generation known in the art.

Initializing 172 the logical bases may include assigning an initial value to the logical bases 106a-106c. The initial value may be provided by a random number source or read from a file. For example, the current values of the logical bases 106a-106d of the RPGMs 102a-102d may be stored in a file after the RPGMs 102a-102d is no longer being used. When the process of encrypting restarts after an interruption and the RPGMs 102a-102d are needed, the values may be read from the file and the logical bases 106a-106d initialized to their stored values.

In some embodiments, it may be desirable to continue the process of encrypting after an interruption as if no interruption had occurred. Accordingly the current values logical bases 106a-106d, randomizing numbers 158a-158d, or the like, may be written to a file prior to an interruption and then retrieved to initialize the logical bases 106a-106d and randomizing numbers 158a-158d.

Alternatively, in some embodiments, a recipient of an encoded message may need to set the state of the RPGMs 102a-102d stored on a recipient computer to the same state as the RPGMS 102a-102d stored on the source computer. Accordingly, initializing 172 the logical bases may include retrieving the logical bases 102a-102d from the source computer. For example, the source computer may transmit the logical bases 102a-102d. For embodiments including randomizing numbers 158a-158d, the initial values for the randomizing numbers 158a-158d may be transmitted to a recipient computer as well. Accordingly, the process of initializing 172 the logical bases may include initializing the values of the randomizing numbers 158a-158d.

Getting 174 a selection RPGM address may include retrieving the value at location 152d in the address table 150d. Getting 176 the selection RPGM entry may include retrieving the value at the address determined in step 174. The value in step 176 will typically correspond to an RPGM 102a-102c, or cipher RPGM 102a-102c. Getting 178 the cipher RPGM address may include retrieving the value at location 152a-152c of the RPGM identified in step 176. Returning 180 the cipher RPGM entry may include returning the value stored in the pattern table 108a-108c at the address corresponding to the value retrieved in step 178 (location 154a-154d). Updating 182 randomizing numbers may include adding the value at location 152d to each of randomizing numbers 158a-158d and storing the respective results as the randomizing number 158a-158d. Updating 184 logical bases may include adding the randomizing number 158a-158d to their respective logical bases 106a-106d and storing the result as the new value for the logical base 106a-106d.

It will be noted, that the process 168 may have various forms depending on the embodiment of the RPGM used. For embodiments lacking address tables 150a-150d, the steps of getting 174 a selection RPGM address and getting 178 a cipher RPGM address may be omitted. Likewise, for embodiments lacking randomizing number 158a-158d, the step of updating randomizing numbers 182 may be omitted, and the step of updating 184 the logical bases may simply include adding a fixed number to the logical bases 106a-106c, or retrieving a random number from a specified source, or changing the logical base 106a-106c according to a rule which change from one access to another. Thus, the logical base may be advanced according to one rule in one iteration, and advanced according to another on a next iteration (e.g. add two one iteration and add five the next).

Steps 174 through 184 of the process 168 may be repeated each time a value is returned. Whereas steps 170 and 172 may be repeated less often. For example, when encrypting messages, the message may be divided into segments, or into segments and then further divided into bit patterns or subsegments, with a corresponding bit pattern being returned by the RPGMs 102a-102d for each segment, or bit pattern. Accordingly, steps 170 and 172 may be executed once per message, or once in a specified time period, whereas steps 174 through 184 are repeated once per segment, repeatedly for each segment, once per bit pattern forming a segment, or repeatedly for each bit pattern forming a segment.

Figure 8:
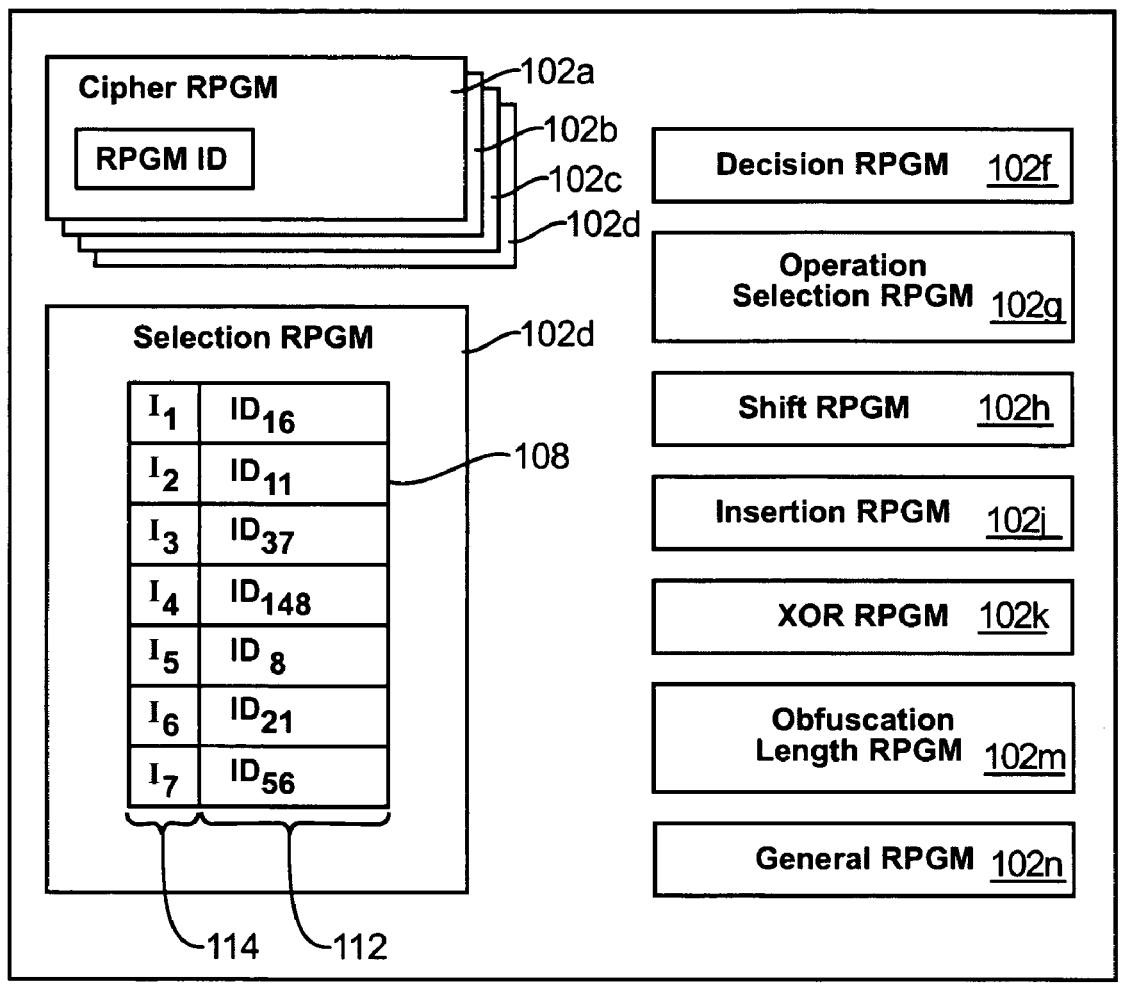
FIG. 8 is a schematic block diagram of a series of dedicated RPGMs, in accordance with the invention.

Referring to FIG. 8, in some embodiments of the present invention, random numbers may be needed for various purposes to accomplish the encryption of clear text.

Accordingly, a plurality of RPGMs 102f-102m may be provided to supply random numbers for specific purposes. Alternatively, a single general RPGM 102n may be provided that supplies random number numbers for various purposes.

Specific RPGMs 102f-102m may include a decision RPGM 102f providing random numbers that may be compared to a number from another source, or another number from the decision RPGM 102f, in order to make a decision, such as whether to execute a particular process. An operation selection RPGM 102g may return a value that corresponds to one of a finite number of possible operations in order to control what operation, among alternative operations, is to be executed. The shift RPGM 102h may be accessed to determine how many positions encrypted text is to be shifted in order to obfuscate the encrypted text further. An insertion RPGM 102j may be accessed to determine how many dummy bits to insert into a segment of encrypted text. An XOR RPGM 102k may be accessed to determine what value is to be exclusive or'ed with encrypted text. An obfuscation length RPGM 102m may be accessed to determine how many bits of an encrypted message are to be subject to an obfuscation process. A general RPGM 102n may be provided to output random patterns for multiple purposes. In some embodiments a routine to convert the various bit patterns into a number may be provided. Any of the above mentioned functions may be performed using the general RPGM 102*n*

Figures 9, 10:
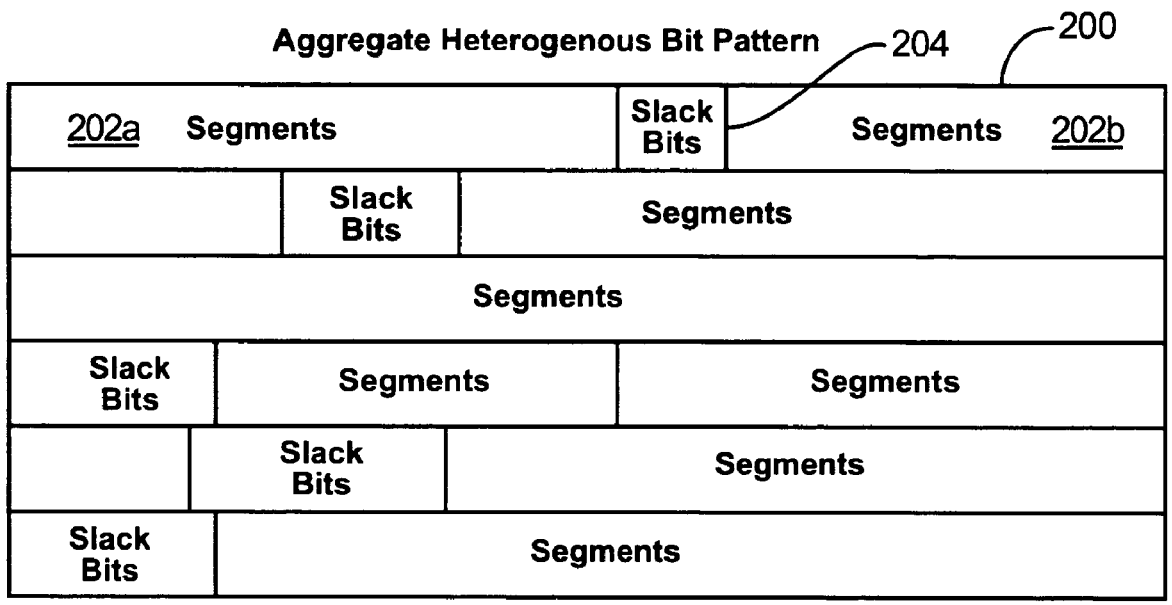
FIG. 9 is a schematic block diagram of an Aggregate Homogeneous Bit Pattern (AHBP, in accordance with the invention.
FIG. 10 is a schematic block diagram is a schematic block diagram of a logical base table, in accordance with the invention.

Referring to FIG. 9, in some embodiments the pattern tables 108*a*-108*d* of the RPGMs 102*a*-102*d* may be stored in an aggregate heterogeneous bit pattern (AHBP) 200 (herinafter RPGM 102 shall refer to any and all RPGMs 102*a*-102*n* forming the data source 100, specicific RPGMs 102*a*-102*n* will be called out where disclosure is specifically directed thereto). The address tables 150*a*-150*d*, logical bases 106*a*-106*d*, or both, may likewise be stored in the AHBP 200. The AHBP may store the tables 108*a*-108*d*, 120*a*-120*d*, and other parameters in a ransom fashion, with portions of an individual table 108*a*-108*d*, 120*a*-120*d* stored in different locations. For example, segment 202*a* may include a portion of pattern table 108*c*, wheras segment 202*b* stores a portion of pattern table 102*d*. Slack bits 204 may be inserted between the segments 202*a*-202*b* in order to further obfuscate the AHBP.

The AHBP may store the tables 108*a*-108*d*, 120*a*-120*d* in a form ready to be transmitted to a recipient computer. In order for a recipient computer to decode a message, the recipient computer must have access to the tables 108*a*-108*d*, 120*a*-120*d* used to encode the message. Accordingly, the tables 108*a*-108*d*, 120*a*-120*d* may be divided up in a random fashion and stored in the AHBP and then transmitted to the a recipient computer. The AHBP may then be transmitted to a recipient computer in a fashion that is not readily understood by an unintended recipient.

Alternatively, in some embodiments, the AHBP is not encrypted. That is the parameters defining a data source 100, or RPGM 102 may be sent without obfuscation where the security level is not high. Thus the AHBP is simply a data block describing an RPGM 102 or system of RPGMs 102*a*-102*d*.

Referring to FIG. 10, in some embodiments the logical bases 106*a*-106*d* may be stored in a separate logical base table 206. The logical base table 206 may store the logical bases 106*a*-106*d* in a ordered in random fashion within the logical base table 206 in order to inhibit their use by unintended recipients. Slack bits 204 may be inserted between the logical bases 106*a*-106*d* in order to further obfuscate the logical base table 206. In some embodiments, portions of an individual logical base 106*a*-106*d* may be stored in separate locations within the logical base table. The logical base table 206 may be sent to a recipient computer in order to interpret messages sent from a source computer. Aleternatively, in some embodiments an address in the AHBP 200 may be sent and the logical base extracted from the AHBP at that address. In yet another alternative, an AHBP Identifier and an address may be used to identify the AHBP from among many to which the address relates.

Figure 11:
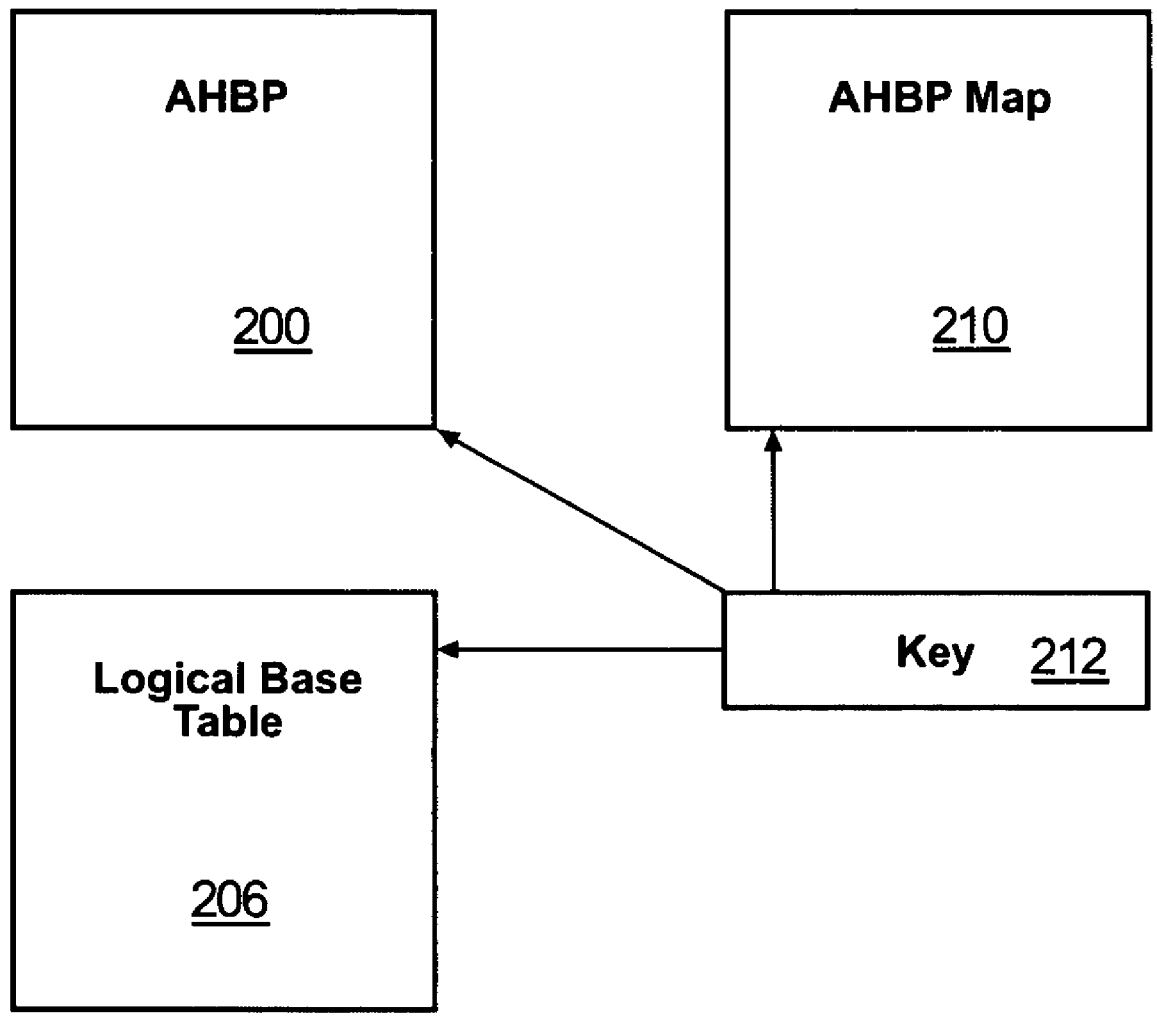
FIG. 11 is a schematic block diagram illustrating the interrelationship of an AHBP, AHBP map, logical base table, and key, in accordance with the invention.

Referring to FIG. 11, an AHBP map 210 may be created during creation of the AHBP and store information necessary to reassemble the RPGMs 102 from data stored within the AHBP 200. The AHBP may likewise store information necessary to associate logical bases 106*a*-106*d* stored within the logical base table 206 with their original RPGM 102*a*-102*d*. The AHBP 200 may likewise contain data sufficient to assemble a logical base 102*a*-102*d* stored in separate locations within the logical base table 206 into its original form.

In some embodiments the AHBP 200, AHBP map 210, and logical base table 206 may be encrypted, or stored in separate locations having no association with one another. A key 212 may be provided to relate an AHBP 200 with its associated AHBP map 210 and logical base table 206. In some embodiments, the key 212 may simply store the storage location of the AHBP 200, AHBP map 210, and logical base table 206. In other embodiments the AHBP 200, AHBP map 210, and logical base table 206 may be encrypted and the key 212 may be a parameter necessary for decryption such as a logical base in a designated RPGM 102.

It will be noted that whether a key 112 is used to relate the AHBP 200, AHBP map 210, and logical base table 206 may depend on the level of security desired. That is, for example, where a low degree of security is necessary the AHBP 200, AHBP map 210, and logical base table 206 may be stored in a single file, or directory and a key 212 may be unnecessary to interpret the AHBP 200, AHBP map 210, and logical base table 206.

Referring to FIG. 12, an AHBP map 210 may store RPGM records 218 indicating parameters enabling reconstruction of an RPGM 102*a*-102*d*. This illustrated embodiment is suitable for reconstructing or accessing the pattern tables 108*a*-108*d* forming the RPGMs 102*a*-102*d*. An RPGM record 218 may include an RPGM ID 220 identifying the RPGM 102*a*-102*d* to which the RPGM record 218 corresponds; a starting AHBP address indicating a the first address within the AHBP wherein an RPGM 102*a*-102*d* is stored; a segment count 224 indicating the number of segments within the AHBP belonging to the RPGM 102*a*-102*d*; a max segment length 226 indicating the length of the longest segment within the AHBP 200 storing the RPGM 102*a*-102*d*; a number of entries 228 indicating the number of patterns 112 stored in the RPGM 102*a*-102*d*; a bits per entry 230 indicating the length of the patterns 112 stored in the pattern table 108 of an RPGM 102*a*-102*d*; logical base information 232 describing the state of the logical base upon storage; a logical base table address 234 indicating where a logical base is stored within a logical base table 206; segment identifier(s) 236 indicating the address or other identifier of segments within the AHBP 200 storing the RPGM 102*a*-102*d*; and an AHBP identifier indicating the AHBP 200 in which the RPGM 102*a*-102*d* is stored. The AHBP 200 map may be used to reconstruct the RPGMs 102*a*-102*d* or it may be used to access it as it is as stored in the AHBP.

Referring to FIG. 13, a segment record 246 may be stored in an AHBP map 210 associated with an RPGM record 218 to describe the segments within an AHBP wherein the RPGM 102*a*-102*d* is stored. This embodiment of a segment record 245 is suitable for reconstructing segments of a pattern table 108*a*-108*d*. A segment record 246 may include an AHBP identifier 248 identifying the AHBP 200 to which the segment record 246 relates; a segment number identifying the particular segment within the AHBP 200 to which this segment record 246 relates; a segment address indicating the location within the AHBP 200 whereat the segment corresponding to this segment record 246 is stored; a segment length 254 indicating the length of the segment in bits; a first entry address 256 indicating the location within the segment or AHBP 200 where the first entry is stored; an entry count 258 indicating the number of entries from the pattern table 108 stored in this segment; an entry number 360, or index 114 within the pattern table 108, of the first entry in this segment; address of the last entry 262 belonging to this segment; a length 264 of the last entry in bits; a filler entry length 266 indicating the length of slack bits inserted after this segment.

Figure 14:
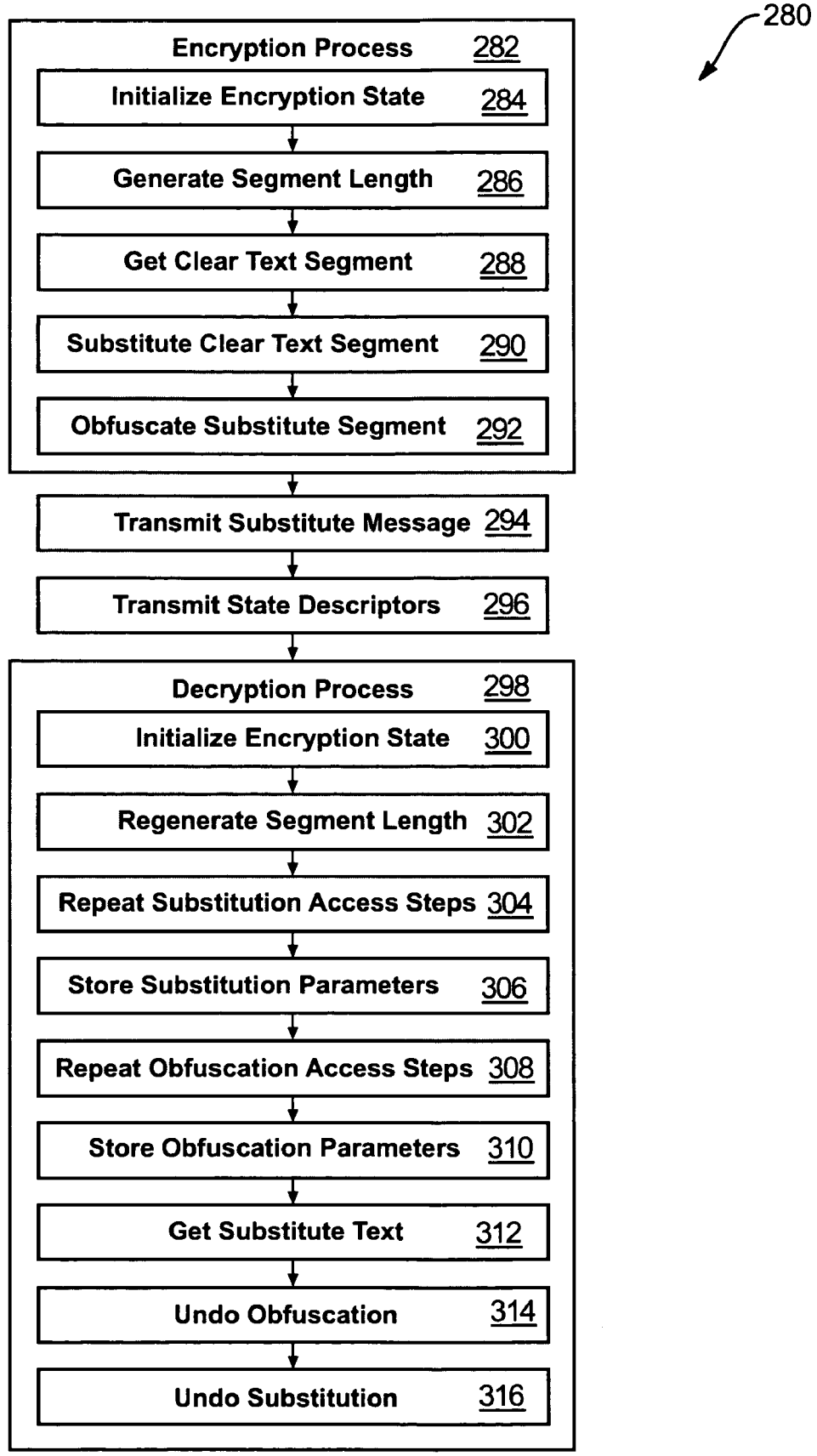
FIG. 14, is a process flow diagram of a process for encrypting and decrypting data, in accordance with the invention.

Referring to FIG. 14, RPGMs 102 (that is one or all of the RPGMs 102*a*-102*n*) may be used to perform the process 280. The process 280 may include executing an encryption process 282. The encryption process 282 may include substituting substitute text for a clear text message. The encryption process 282 may be performed on segments of a clear text message one segment at a time. That is, consecutive segments of a clear text message may be processed one after another until an entire clear text message is encrypted. Segments may be processed in order or at random locations within a clear text message. Segments may be further broken down into bit patterns, with each bit pattern being replaced by a substitute bit pattern.

The encryption process 282 may include initializing 284 an encryption state. Initializing 284 may include initializing the parameters that govern the behavior of the RPGMs 102 such as one or more of the logical base 106, the offset 104, and the randomizing number 158. Initializing a parameter may include assigning an initial value thereto. The initial value may be output from an RPGM, chosen directly by a user, or read from a file or another source of data.

It will be noted that software objects or electronic circuits having the ability to generate random patterns having a state that may be initialized and which changes according to the number of patterns output by the data structure. That is, an RPGM 102 has an initial state determined by its logical base 106, or by its logical base 106, offset 104, and randomizing number 158, depending on the embodiment. As patterns are output by the RPGM the logical base 106 is advanced thereby changing the state of the RPGM 102. The offset 104 and randomizing number 158 may likewise be changed upon each output of a pattern as described hereinabove. Thus, two RPGMs having identical initial logical bases 106, offsets 104, and randomizing numbers 158, and accessed the same number of times will output the same series bit patterns. In a like manner, the system of RPGMs 102a-102d of FIG. 6 has the property that RPGMs 102a-102d stored on one computer having an initial logical base 106, offset 104, and randomizing number 158 will output the same series of patterns as identical RPGMs 102a-102d stored on a second computer and having the same initial logical base 106, offset 104, and randomizing number 158 will output identical series of patterns. Accordingly a data source 100 may be an RPGM 102 or a software object, electronic circuit, or the like having the abovementioned properties may serve the function of an RPGM 102, or system of RPGMs 102a-102d.

The encryption process 282 may include generating 286 a segment length. As discussed hereinabove, a message may be divided into segments of random length. Accordingly, a random length may be chosen based on an output from an RPGM 102, such as the selection RPGM 102d.

The encryption process 282 may include getting 288 a clear text segment from a clear text message. The clear text segment may have a length that is related to the segment length generated in step 286. The process 280 may include substituting 290 a substitute segment for the clear text segment. The substitute segment may be chosen output from the data source 100. The data source 100 may output substitute segment having a bit length equal to, or some ratio of, the clear text segment for which it substitutes. The data source 100 may output the number based on the current state of the data source 100 as well as the value of the clear text. For example, an RPGM 102 may output a pattern 112 based on the current state of the RPGM 102, with the value of the offset 104 set equal to the clear text. Substituting 290 a substitute segment for a clear text segment may be accomplished by substituting a single substitute segment output from an RPGM 102, or by dividing the clear text segment into subsegments and replacing each subsegment with a pattern output from an RPGM 102. The subsegments may be of variable length. For example, the length of a subsegment may be determined by a pattern output from an RPGM 102.

The encryption process 282 may include obfuscating 292 the substitute segment, or substitute subsegment of the substitute segment from step 290. The lengths of the subsegments subject to an obfuscation operation 292 may be different than in the substitution process 290. Obfuscating 292 may include inserting bits before or after the substitute segment, or before or after a subsegment, or applying bit wise operations such as the "exclusive or," shifts, or further substitutions as described in step 290. The parameters defining the obfuscating functions used may be chosen based on outputs from a data source 100, such as an RPGM 102.

The encryption process 282 may be executed for each segment of a clear text message for the entire clear text message. The segments may be processed consecutively or in a random order.

The process 280 may include transmitting 294 state descriptors from a source computer to a recipient computer. The state descriptors may include parameters necessary to set the state of the data source 100 to the initial state of the data source 100 prior to encryption of a message. Accordingly, the state descriptors may include the logical bases 106, offsets 104, randomizing numbers 158 of RPGMs 102 forming the data source 100, or other parameters describing the state of an other data structure or method for providing data in accordance with the requirements of the process 280. The process 280 may include transmitting 296 a substitute message from the source computer to the recipient computer. The substitute message may include the substitute segments generated in step 290.

The process 280 may include executing a decryption process 298. The decryption process 298 may include execution, by the recipient computer, a process similar to the encryption process 282 with the exception that rather than processing a clear text segment, the parameters describing encryption functions are stored and later used to undo the process of obfuscation.

Accordingly, the decryption process 298 may include initializing 300 an encryption state. Initializing 300 may include setting the state of a data source 100 stored on a recipient computer to the same state as a data source 100 stored on a source computer. Accordingly, the logical bases 106, offsets 104, randomizing numbers 158 of RPGMs 102 forming the data source 100 may be initialized to the state descriptors transmitted to the recipient computer in step 294.

The decryption process 298 may include regenerating 302 a segment length. Regenerating a segment length may include regenerating 302 the length of subsegments of a segment. Regenerating 302 a segment length may include accessing the data source 100 as was performed in step 286 of the encryption process 282 to obtain a segment length. Repeating 304 substitution access steps may include outputting from the data source 100 parameters used for a substitution as described in step 290 of the encryption process 280. The data used for substitution in the encryption process may be output by the data source 100 and yet be ignored in step 304. The access may be performed nonetheless to change the state of the data source 100 in order that the state of the data source 100 trace the state of the data source during encryption. The data will be ignored because the offset 104 that is necessary to undo the substitution is not known. The offset 104 is the clear text that is the end product of the decryption process 298.

The decryption process 298 may include storing 306 the substitution parameters. The substitution parameters may include storing the current value of the logical base 106 of the RPGM 102a-102c corresponding to the segment length, subsegment length identified in the segment length regeneration step 302. Thus, if the segment length is seventeen bits, the logical base 106 of the RPGM 102a-102c having patterns seventeen bits in length may be stored. The current value of the randomizing number 158 may likewise be stored 306 as a substitution parameter.

The process of repeating 304 substitution access steps and storing 306 the substitution parameters may be repeated in accordance with the encryption process 282. Thus, the entire segment of substitute text will be processesed, whether as a segment, or divided into sub segments or bit patterns. Thus, the steps 304 and 306 may be repeated as many times as necessary to process an entire segment in accordance with processing performed in the encryption process 282.

The decryption process 298 may include repeating 308 obfuscation access steps. Repeating 308 the steps executed in the obfuscating step 292 of the encryption process 282. Thus, any parameters that were used to obfuscate a segment of clear text may be output from the data source 100, with the state of the data source 100 being changed accordingly.

The decryption process 298 may include storing 310 the obfuscation parameters retrieved in step 308. Parameters may include, bit patterns inserted and their length and point of insertion, the number of positions and direction a substitute segment is shifted, the bit pattern used for an exclusive or, and the location within a substitute segment of any sub-segment of the substitute segment that was the argument to an obfuscation function. The repeating obfuscation access steps 308 and storing 310 obfuscation parameters may be performed in accordance with obfuscation processing in the encryption process 282. That is steps 308 and 310 will be repeated for each obfuscation performed in the obfuscation step 292 of the encryption process 282.

The decryption process 298 may include getting 312 a substitute segment from an encrypted message. The substitute segment may have a length equal to the length obtained in the segment length regeneration step 302. The substitute segment obtained from the encrypted message may have a length equal to the length obtained in step 302 plus the length of any inserted bit patterns.

The decryption process 298 may include undoing 312 obfuscation functions performed on the substitute text. Undoing 312 obfuscating functions may include using parameters obtained in the obfuscation parameter storing step 310 to undo the obfuscation. Thus, inserted bits may be stripped away, an exclusive or may be undone by repeating the exclusive or with the same bit pattern, shifts may be undone by shifting a bit pattern in the opposite direction. It will be noted that obfuscation operations will be undone in the opposite order as when performed in the encryption process 282 and in the obfuscation access step repeating step 308. Thus, if during encryption the steps were ordered as a substitution, and exclusive or, a shift, a substitution, and an insertion, the decryption steps would be executed as: undoing the insertion, undoing the substitution undoing the shift, undoing the exclusive or, undoing the substitution.

Undoing the substitution 316 may include undoing the substitution of clear text segment for substitute segment, or the substitution of clear text for a substitute subsegment, or bit pattern. Accordingly, the value of the logical base 106 at the state when the substitution was performed in the encryption process 280 and the un-obfuscated substitute text may be interpreted to derive the offset 104 that would have yielded the substitute text when combined with the logical base 106. It will be noted, that for data sources 100 embodied as other than an RPGM 102 the substitute segment, or substitute subsegment, or bit pattern, and other parameters describing the state of the data source 100 may be used to undo the process of substitution.

Figure 15:
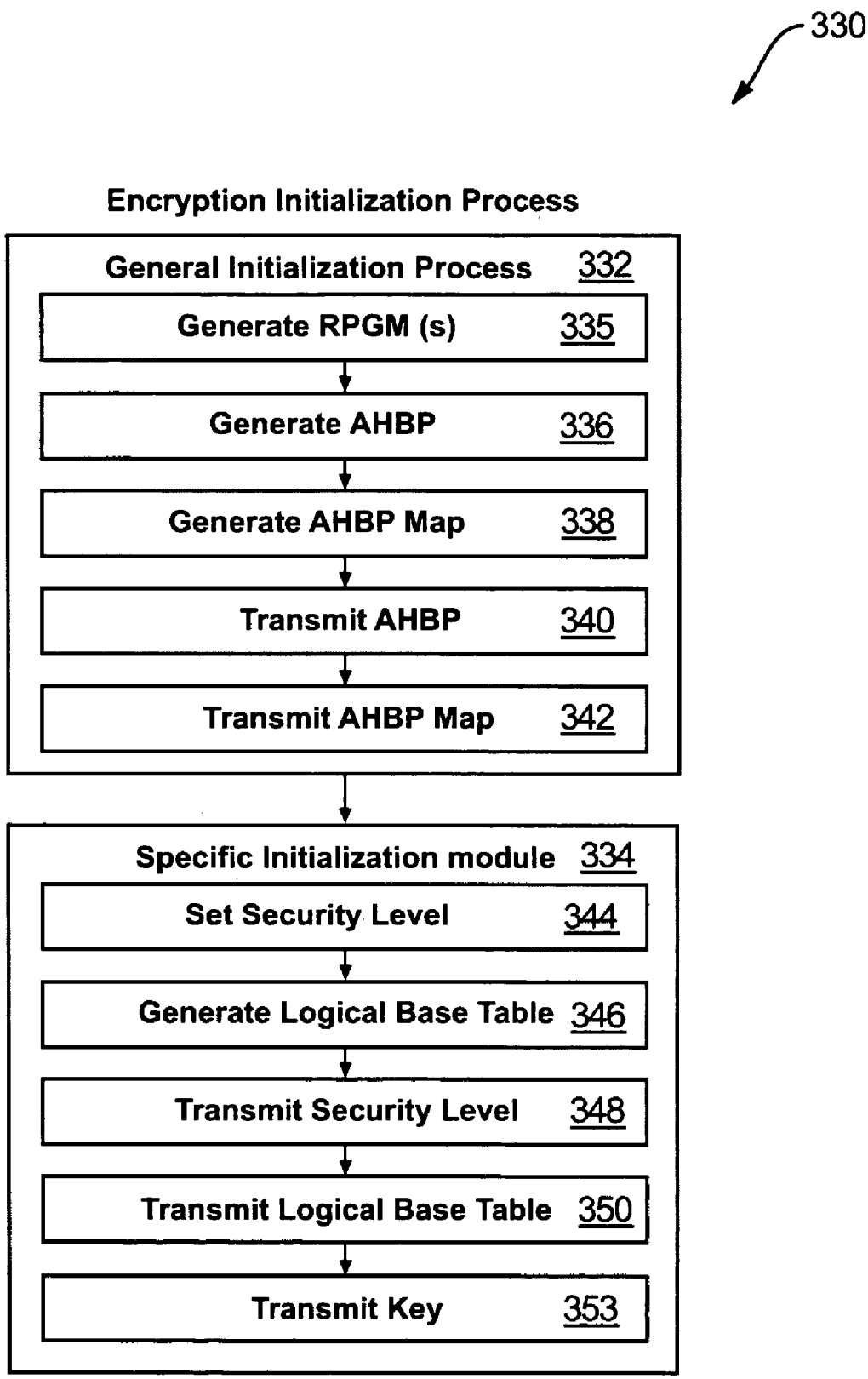
FIG. 15 is a process flow diagram of an encryption initialization process, in accordance with the invention.
Figure 16:
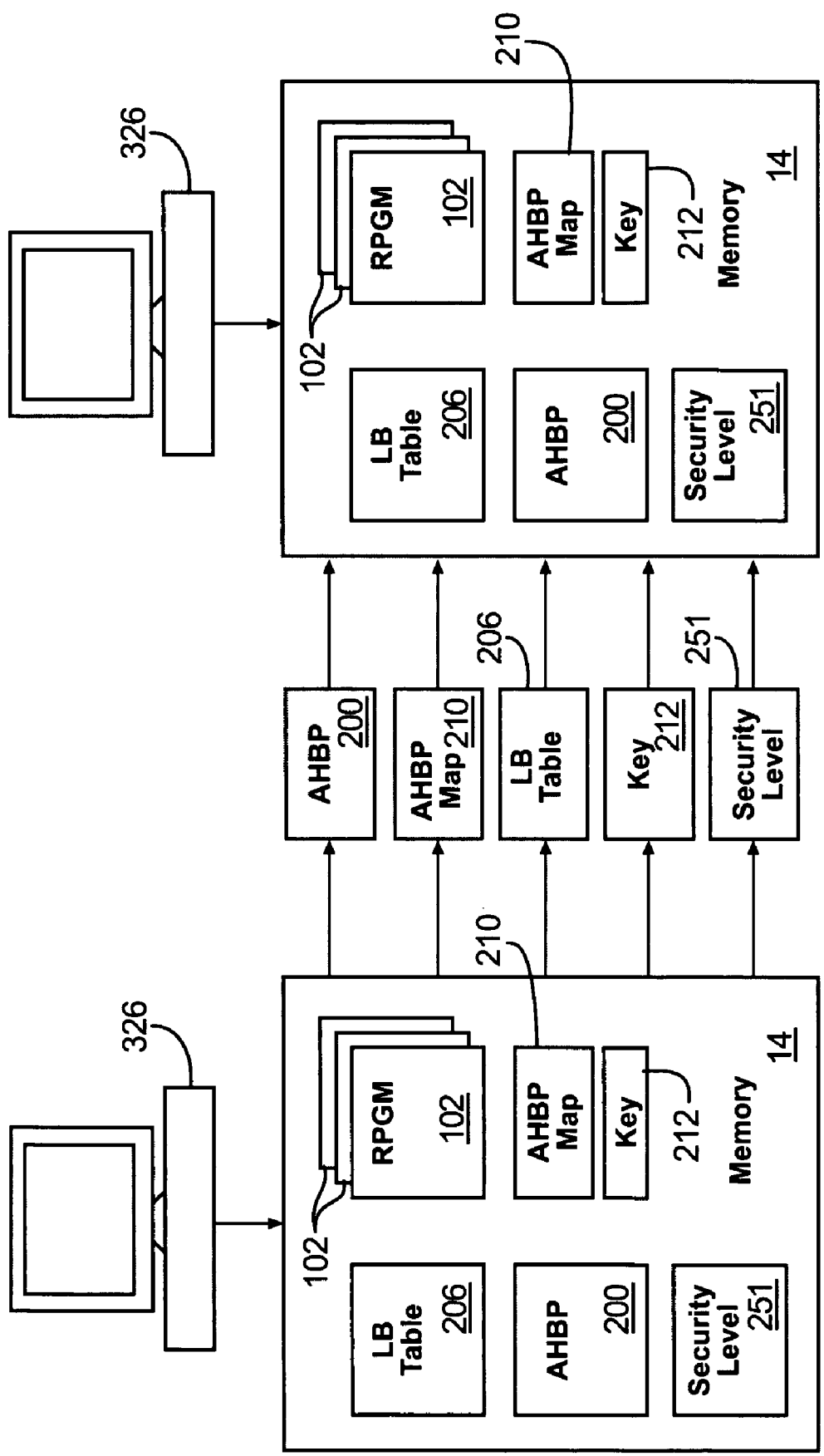
FIG. 16 is a schematic block diagram of the flow of data in an encryption initialization process, in accordance with the invention.

Referring to FIGS. 15 and 16, the process 280 may be preceded by an encryption initialization process 330. The encryption initialization process 330 may include creating data sources 100 on both a source computer 326 and a recipient computer 328 having identical initial states, such that the process 280 may be executed thereby. The source computer 326 and the recipient computer may be embodied as a node 11 of FIG. 1. Accordingly, the process 330 may include a general initialization process 332. The general initialization process 332 may include steps which are executed periodically on an other than a per message basis. For example, general initialization process 332 may synchronize the states of data sources 100 on source computer 326 and recipient computer 328 daily, monthly, annually, or upon direction of a user, or some other criteria.

The process 330 may include a specific initialization process 334 executed on a more frequent basis than the general initialization process 332. For example, the specific initialization process 334 may be executed on a per message basis.

The general initialization process 332 may include generating 335 the RPGMs 102, or RPGMs 102a-d described hereinabove. The general initialization process 332 may also include generating 336 an aggregate heterogeneous bit pattern (AHBP) 200. In embodiments where the AHBP is an obfuscated representation of the state of the data source 100, an AHBP map generating step 338 may include generating an AHBP map 210 to enable recreation of the data source 100 on a recipient computer. The general initialization process 332 may include transmitting 340 the AHBP to from a source computer 326 to a recipient computer 328 and transmitting 342 the AHBP map from a source computer 326 to a recipient computer 328.

The specific initialization process 334 may include setting 344 a security level 251 as discussed herein, various operation may be included or omitted in the process of encrypting 282 and decrypting 298 messages. A security level 251 may represent the set of processes actually executed to achieve a particular level of security. Accordingly, a necessary parameter to enable a recipient computer 328 to decrypt a message will be the security level 251 used to encrypt the message by the source computer 326. The security level 251 may be set 344 on a per-message basis or as part of the general initialization process 332.

The specific initialization process 334 may include generating 346 a logical base table. Generating 346 a logical base table may include generating a table or like representation of the initial state of the data source 100. Where the data source 100 is an RPGM 102, or system of RPGMs 102a-102d, the generating 346 a logical base table may include creating a logical base table 206 storing the logical base 106, or logical bases 106 and randomizing numbers 158, depending on the embodiment of the RPGM, or RPGMs 102a-102d.

The specific initialization process 334 may include transmitting 348 the security level to a recipient computer 328 and transmitting 350 the logical base table. In embodiments where a key 212 is required to interpret the logical base table 206 and AHBP 200, the specific initialization process 334 may include transmitting 353 the key to the recipient computer 328. It will be noted that transmitting 348 a logical base table may be accomplished without transmitting the actual values of the logical bases 106. For example, an address or code instructing the recipient computer where to find the logical bases 106 in a table, such as the AHBP 200, may be transmitted instead.

It will be noted that the steps illustrated as forming the general initialization process 332 and specific initialization process 334 may be executed as either part of the general initialization process 332 or specific initialization process 334 depending on the frequency in which data sources 100 are desired to be synchronized. Thus, for example, all of the steps forming the specific initialization process 334 may be executed as part of the general initialization process 332. Likewise, all of the steps forming the general initialization process 332 may be performed as part of the specific initialization process 334.

Figure 17A:
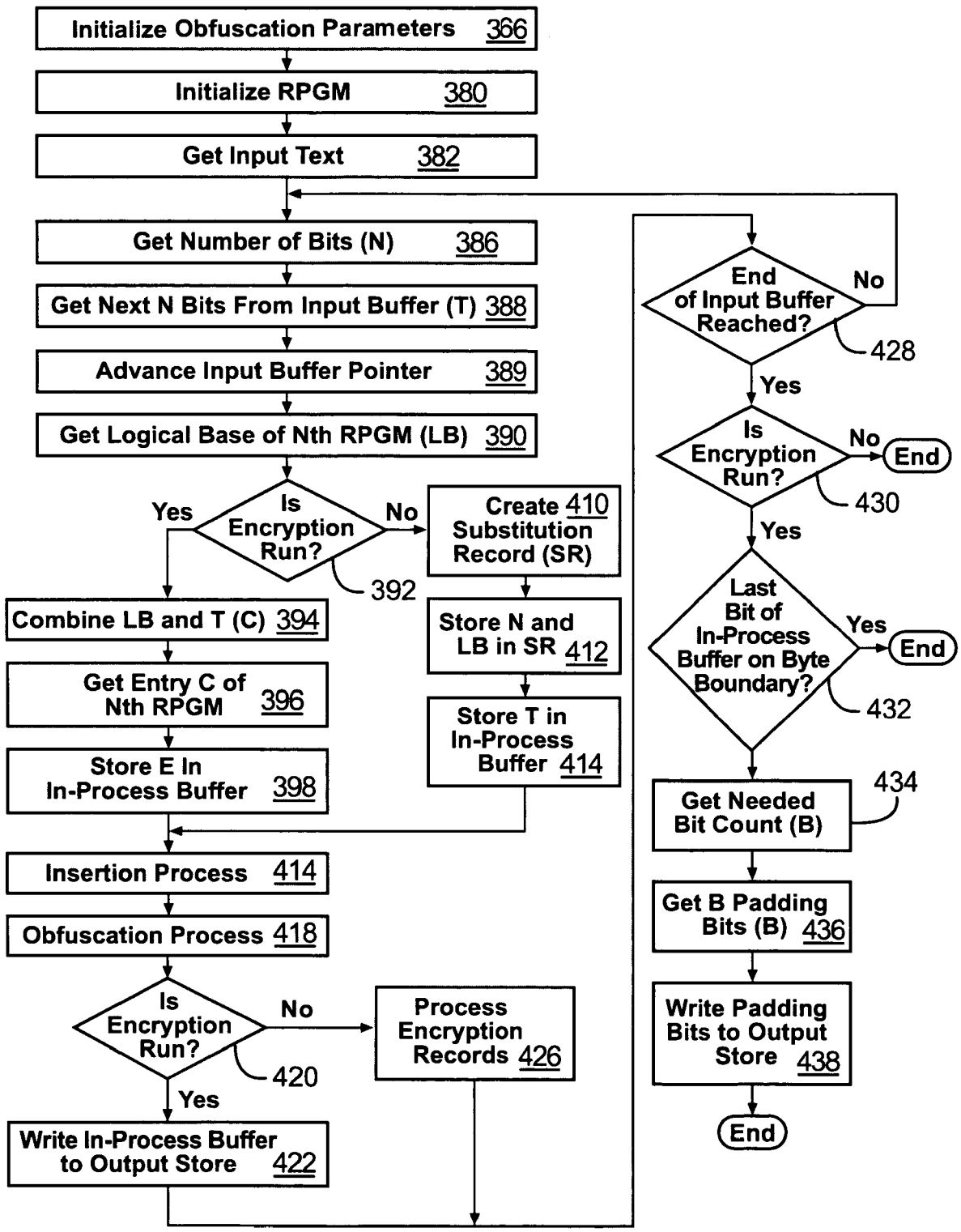
FIG. 17A is a process flow digram of one embodiment of a method encrypting and decrypting data, in accordance with the invention.

Referring to FIG. 17A, the process 280 may be implemented through the operations illustrated in FIG. 17A. The process 280 may include initializing 370 obfuscation parameters. Obfuscation paramtaters may determine the degree and frequency of obfuscation functions. The obfuscation parameters may be a function of the security level. That is, for different security levels obfuscations of different degree and frequency will be performed.

For example, obfuscations may include inserting bits, performing substitutions, executing an exclusive or, or shifting bits. Accordingly, the obfuscation parameters may indicate such things as how many positions bits are to be shifted, how many bits are to be inserted, and how likely it is that an obfuscation function will be performed. For a low security level, the obfuscation parameters may indicate that obfuscation operations are to be performed less frequently and that they are to be to a lesser degree (e.g. fewer shift positions and fewer inserted bits) than for a higher security level.

Figure 18:
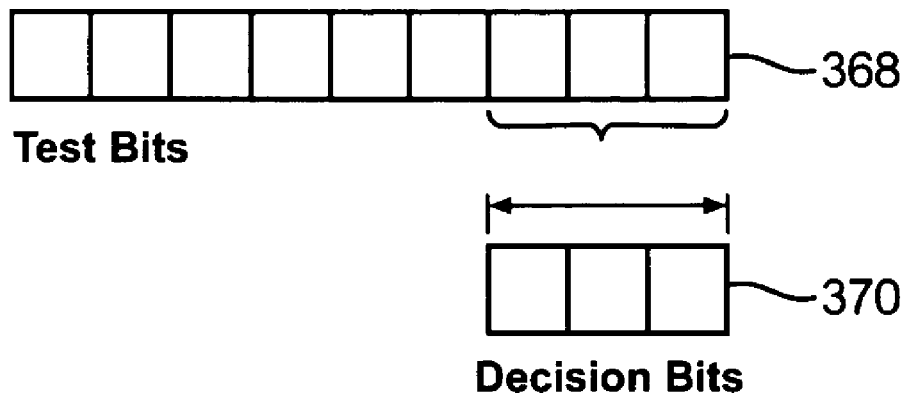
FIG. 18 is a schematic block diagram of obfuscation parameters in accordance with the invention.
Figure 19:
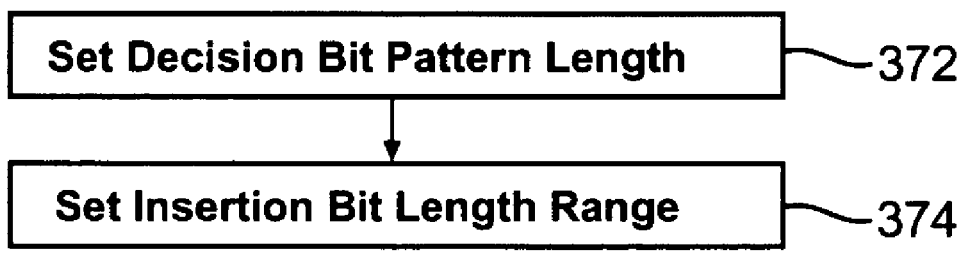
FIG. 19 is a process flow diagram of a obfuscation parameter initialization process, in accordance with the invention.

Referring to FIGS. 18 and 19, while still referring to FIG. 17A, obfuscation parameters may include test bits 368 and decision bits 370. Initializing 366 obfuscation parameters may include setting 372 the length of the decision bits 370 and setting 374 an insertion bit length range. The test bits 368 and decision bits 370 may represent variables or registers containing binary numbers evaluated to decide whether to perform an operation, which operation to perform, and parameters governing an operation. The test bits 368 may be a pattern of any length. The test bits may be set equal to a random number. In some embodiments, the random number may be derived from a pattern output from an RPGM 102 in a prior operation, or a number output from an RPGM 102 specifically for the purpose of use in making an obfuscation decision. In some embodiments, the test bits 368 may be read from the AHBP 200. for example, with each successive decision involving the test bits 368 the bit pattern used for the test bits 368 may be the next bits from the AHBP 200, beginning at the start, or some other specified point within the AHBP 200 and moving through the AHBP 200 as bit patterns are read therefrom.

The decision bits 370 may have a length 376. The decision bits may be chosen in a like manner as the test bits 368. The test bits 368 may be compared to the segment 378 of the decision bits 370 having a length equal to the length 376 to determine if they are equal, or have some other specified relationship. If the test bits 368 and segment 378 are equal, or satisfy some other condition, then a decision may be decided in one fashion, if they are not, a decision may be decided in a second fashion. The length 376 of the decision bits may determine the probability that the decision bits 370 and the segment 378 will be equal. For example, if the decision bits 370 have a length 376 of one bit, the likelihood that the decision bit 374 will be equal to the segment 378 is 50%. If the length 376 of the decision bits 370 is greater, the probability of equality is reduced. Accordingly, for low security levels, where obfuscations are to be less frequent, the length 376 of the decision bits 370 may be greater than for high security levels.

Initializing 366 obfuscation parameters may also include setting 374 an insertion bit length range. In some embodiments of the process 280, dummy bits may be inserted after encrypted text to further deter unintended decryption. The number of bits inserted may be a function of the security level, with more bits being inserted for higher insertion levels than for lower security levels. Accordingly, setting 374 an insertion bit length range may include setting a flag or other variable indicating the range of insertion bit length ranges corresponding to the security level applying to a current execution of the process 280.

Referring again specifically to FIG. 17A, the process 280 may include initializing RPGM(s). Initializing 380 RPGMs may include creating the tables forming part of the RPGM 102, or RPGMs 102. Initializing 380 RPGMs may also include initializing the logical base 106 of the RPGM, or the logical bases 106 or the RPGMs, forming the data source 100. For example, if the process 280 is executed by a recipient computer 328, the logical bases 106 may be initialized 380 to the values of the logical base table 206 transmitted to the recipient computer 328 from the source computer 326.

Figure 20:
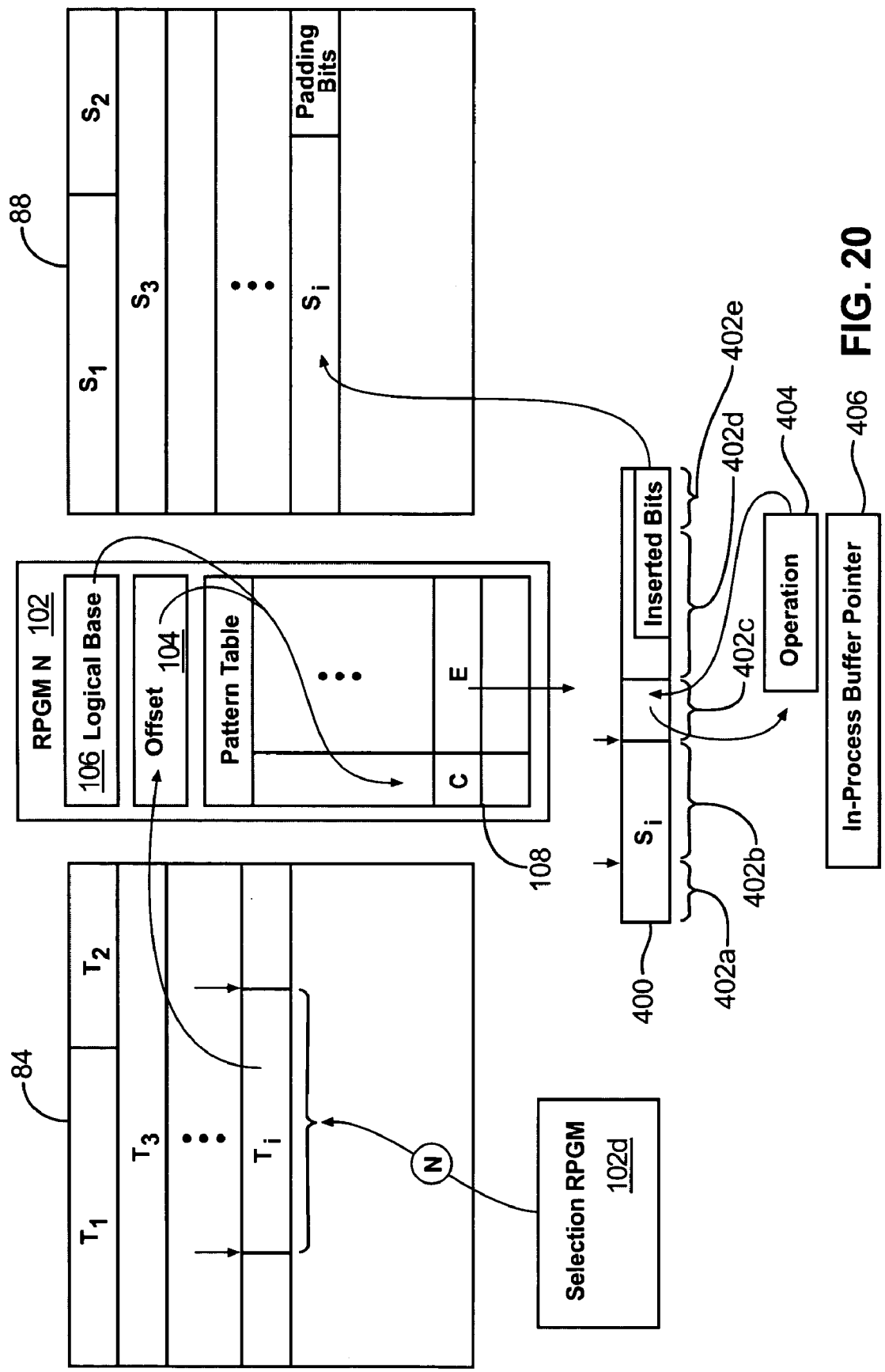
FIG. 20 is a schematic block diagram of data structures suitable for use in an encryption and decryption process, in accordance with the invention.

Referring to FIG. 20, while still referring to FIG. 17A, the process 280 may include getting 382 input text and storing the input text in an input buffer 84 having an input buffer pointer 385 indicating the point at which bits will be read from the input buffer 84. The input text may include any type of data that may be represented in binary from that is to be encrypted using the process 280. Thus input text may be characters, digital video, digital audio, or any other form of data.

The process 280 may include getting 386 a number of bits (represented by variable N). The getting 386 a number of bits may include retrieving from an RPGM 102 a number interpreted as a number of bits N. For example, the selection RPGM 102d may be accessed. The pattern output from the RPGM 102d may indicate which of the RPGMs 102a-102c is to be accessed for a substitute pattern as well as the number of bits (N).

The process 280 may include getting 388 the next N bits of input text (T) from the input buffer 84. The process 280 may then include advancing 389 the input buffer pointer 385 to point to the beginning of the next bit pattern in the input buffer 84. The input text T may be read from start of the input buffer 84 on a first iteration and be read from the next consecutive location upon subsequent iterations. For example, the input text T may be read from position 391a pointed to by the input buffer pointer in the input buffer upon one iteration. In the next iteration of the process 280, the input text T may be read from position 391b. In this manner, the entire contents of the input may be operated upon by the process 280.

The process 280 may include getting 390 the logical base 106 (LB) of the Nth RPGM. The Nth RPGM may be the RPGM 102a-102c having a pattern table 108 containing bit patterns of length N. In some embodiments, multiple RPGMs 102a-102c may have the patterns of the same length. In such an embodiment, getting 386 the number of bits may include selecting an RPGM 102a-102c based on a pattern output from the selection RPGM 102d, and evaluating the length of the bit patterns stored therein to determine N. Where there is only one RPGM 102a-102c having a patterns of a given length, N will uniquely identify both the RPGM 102a-102c and the length of patterns stored therein. Where there are multiple RPGMs 102a-102c having patterns of the same length, additional information will be required in step 390 to obtain the correct logical base. Accordingly, step 390 will include getting 390 the logical base of the pattern identified in step 386, rather than simply the Nth RPGM. The discussion applies to any other situation in the following disclosure in which the Nth RPGM is referred to. The Nth RPGM, in embodiments having multiple RPGMS 102a-102c is the RPGM identified in step 386. Likewise step 386, for such embodiments, includes both retrieving a pattern identifying an RPGM 102a-102c and ascertaining the bit length of patterns stored therein.

The process 280 may then include evaluating 392 whether the current execution of the process 280 is encrypting or decrypting data. If the current execution is an encryption run, LB and T may be combined 394. This may include setting the offset 104 of the Nth RPGM equal to T. Combining 394 may include converting T to an integer and adding it to LB (the result is designated as the index C). The process 280 may include getting 396 the entry (substitute text E) at index C within the pattern table 114 of the Nth RPGM. For embodiments of RPGMs 102 having address tables, the substitute text E may be chosen as the value stored at the index in the pattern table 112 having a value equal to the value stored at index C within the address table 150 of the Nth RPGM.

The process 280 may include storing 298 E in the in-process buffer 400. The substitute text E may be divided into subsegments 402a-402e. obfuscation Operations 404 may be performed on the subsegments 402a-402e. The length of the subsegments 402a-402e and the operations 404 performed thereon may be chosen dynamically. An in-process zbuffer pointer 406 may indicate the starting bit position 408 of the subsegment 402a-402e serving as the argument to an operation 404. The in-process buffer pointer 404 may be advanced after a subsegment 402a-402e is operated on to point to the starting position 406 of the next subsegment 402a-402e.

If the current execution of the process 280 is a decryption run, the process 280 may include creating 410 a substitution record (SR). the substitution record SR may store parameters necessary to undo a substitution. Accordingly, process 280 may include storing 412 the number of bits N and the logical base LB in the substitution record SR. The process 280 may likewise include storing 414 the text T read from the input buffer in the in-process buffer 400.

The process 280 may include execution of an insertion process 416. The insertion process 416 may write dummy bits to the end of the in-process buffer 400 in order to further obfuscate the substitute text E. The process 280 may include executing an obfuscation process 418. The obfuscation process 418 may execute bit-wise obfuscation functions on the contents of the in-process buffer 400.

The process 280 may include evaluating 420 whether the current execution is an encryption run. If it is, the process 280 may include writing 422 the contents of the in-process buffer to the output buffer 88. The output buffer 88 may store segments of encrypted text prior to the transmission of an entire encrypted message from the source computer 326 to the recipient computer 328. When the process 280 is decrypting text, the output buffer 88 may store clear text prior to retrieval of the clear text by an application or display of the clear text to a user.

If the process 280 is not executing an encryption run, the process 280 may include processing 426 encryption records. Encryption records may include records storing parameters describing encryption operations executed in order to encrypt clear text. The encryption records may then be subsequently be processed to undo the encryption and retrieve the original clear text from encrypted text.

The process 280 may include evaluating 428 whether the end of the input buffer has been reached. If the end has not been reached, the process 280 continues execution at step 386. If the end has been reached, then the process 280 may include evaluating 430 whether the current execution of the process 280 is an encryption run. If it is not, the process 280 ends. If it is, then the process 280 may include evaluating 432 whether the encrypted text written to the output buffer 88 ends on a byte boundary. If it does not, the process 280 ends. If it does, the process 280 may include getting 434 the needed bit count (B), that is, the amount of bits needed to complete the last byte of the output buffer 324. The process 280 may then include getting 436 B padding bits 440 to add to he output buffer 324. The padding bits 440 may come from the Bth RPGM (the RPGM 102 having patterns of length B) or may be read from the AHBP 200. The process 280 may include writing 440 the padding bits to the output buffer 324. During decryption, the padding bits may be ignored. That is to say, during decryption the length of the encrypted text including substitute text and inserted text may be determined, the number of bits needed to complete the last byte may be determined, and that number of bits from the input store 82 ignored when reading the next message segment form the input store. Alternatively, in some embodiments, reading bits from the input store may require that data be read in bytes, rather than bits, accordingly reading in segment from the input store including substitute text and inserted text may automatically accommodate trailing bits needed to complete a byte.

Figure 17B:
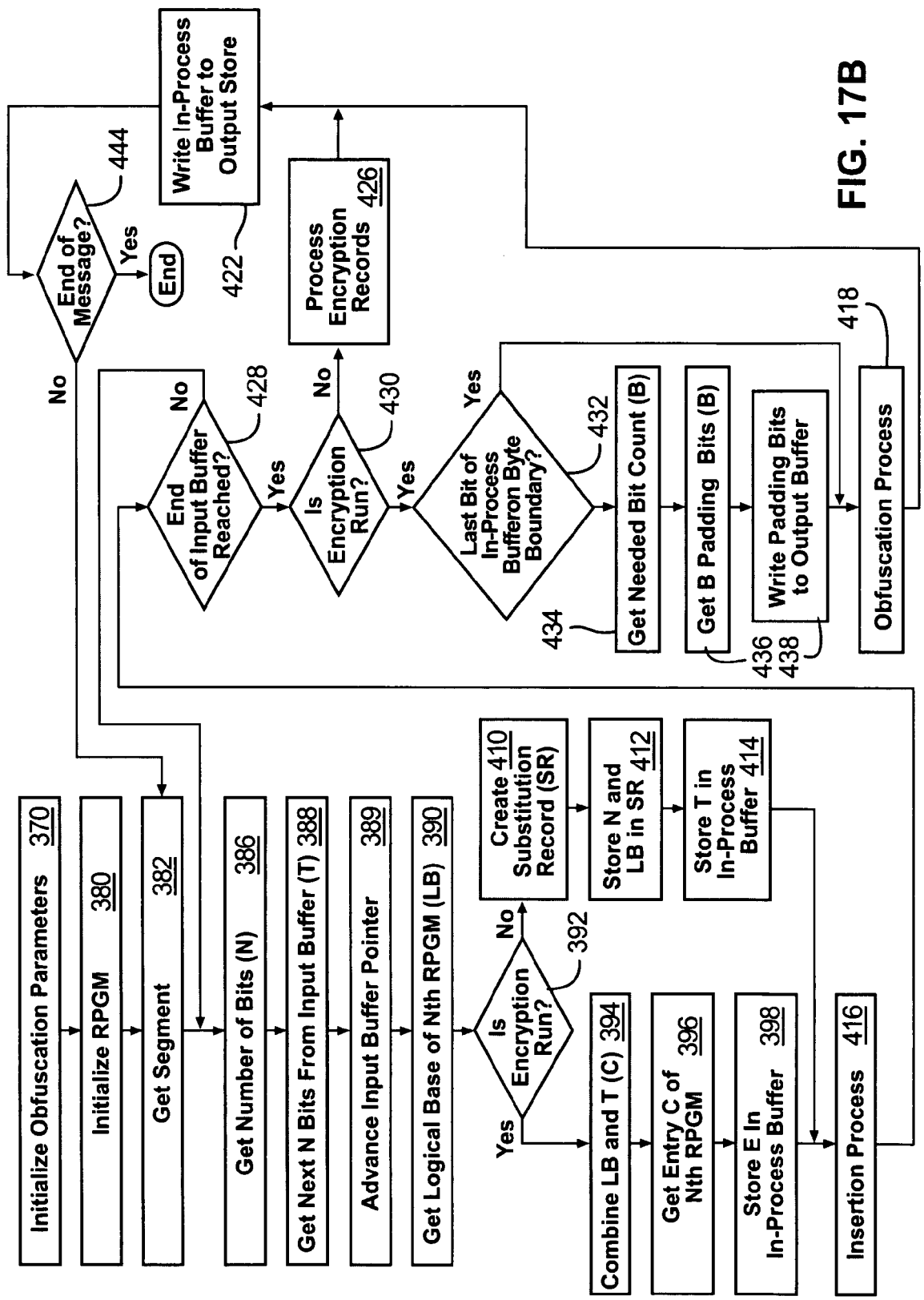
FIG. 17B is a process flow digram of an alternative embodiment of a method for encrypting and decrypting data, in accordance with the invention.

Referring to FIG. 17B, the process 280 may be embodied as illustrated in FIG. 17B. A message that is to be sent may be divided into segments. The segments may be further divided into bit patterns for which cipher text is substituted. The collective bit patterns for a segment may be divided into bit patterns, or subsegments, not corresponding to the bit patterns for which substitute text was substituted, with these bit patterns being subject to obfuscation functions.

Accordingly, step 382 may be modified to include getting 382 a segment from the input store. A segment may be measured in bytes and be sufficiently large that subdivision into bit patterns is practicable. The processing of encryption records may take place after the entire segment has undergone the re-creation of the encryption. That is to say, after the end of the input buffer 84 has been reached. Likewise the obfuscation process 418 may be executed after the entire segment, or input buffer 84 has been processed and substitute text for each bit pattern, or subsegment, of the segment has been stored in the in-process buffer 400. The contents of the in-process buffer 84 may then be written 422 to the output store. It will be noted that in the embodiment of FIG. 17B, writing E to the in-process buffer will include writing E to the input buffer adjacent to and after the substitute text E written to the buffer in the previous iteration involving this segment. That is to say, that subsegments of a segment will be substituted and written one after another to the in-process buffer 400, such that at step 418 the in-process buffer has collected all E's generated for one segment.

The process 280 may include evaluating 444 whether the end of a message has been reached. If so, the process 280 ends. If not, the process 280 is iterated and another segment is read 382 from the message. It will be noted that the length of the segments may be determined by retrieving a value from the data source 100. For example, a value may be output from an RPGM 102 and be interpreted as the number of bytes to be read in to the input buffer 84 as a segment.

Figure 21:
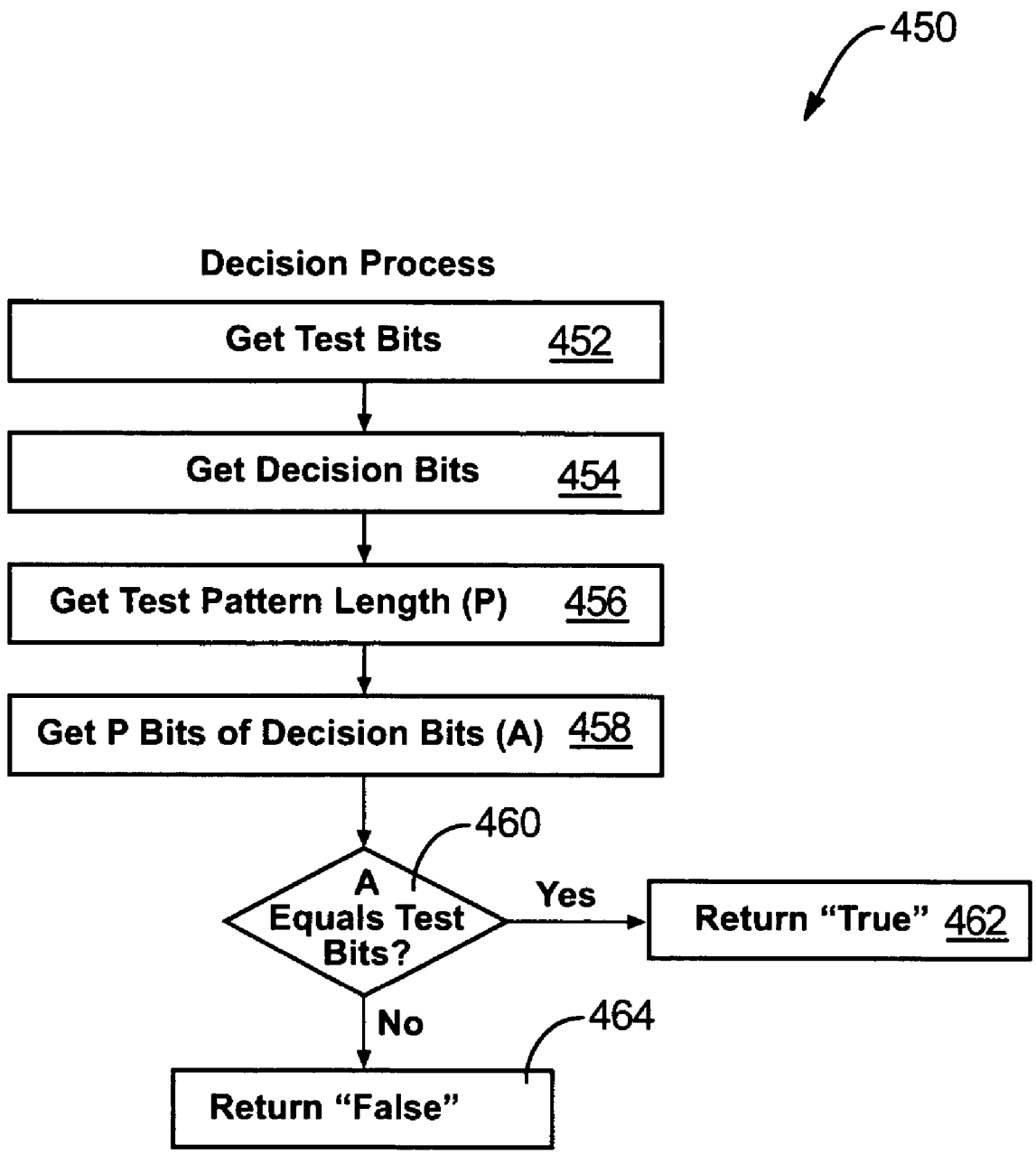
FIG. 21 is a process flow diagram of a decision process in, accordance with the invention.

Referring to FIG. 21, while referring generally to FIGS. 17A and 17B, the process 280 may include various processes that dynamically determine whether to perform a particular operation and what parameters shall apply the operation. Accordingly, a decision process 450 may be executed to dynamically make such decisions. The decision process 450 may include getting 452 the test bits 88. getting 452 the test bits may include retrieving a bit pattern from a random number source and storing the bit pattern as the test bits. The test bits may be read from the AHBP 200, may be output from an RPGM 102, or may be set equal to the value of a parameter in a previous step in the process 280. For example, the text bits may be set equal to the text T read from the input buffer 84, the number of bits N, or the like.

The decision process 450 may include getting 454 the decision bits 324. getting 454 the decision bits may include retrieving a bit pattern from a random number source and storing the bit pattern as the test bits 324. The test bits may be read from the AHBP 200, may be output from an RPGM 102, or may be set equal to the value of a parameter used in, or the result of, a previous step in the process 280. For example, the text bits may be set equal to the text T read from the input buffer 84, the number of bits N, or the like.

The decision process 450 may include getting 456 the length of the test bit pattern (P). The decision process 450 may then include retrieving the P bits (pattern A) located at the end, beginning, middle, or other specified position, of the decision bits 324. The process 280 may then include evaluating 460 whether A is equal to the test bits 324. If they are, the process 350 may return 462 a value corresponding to "true" or "yes." If they are not, the process 350 may return 464 a value corresponding to "false" or "no."

Figure 22:
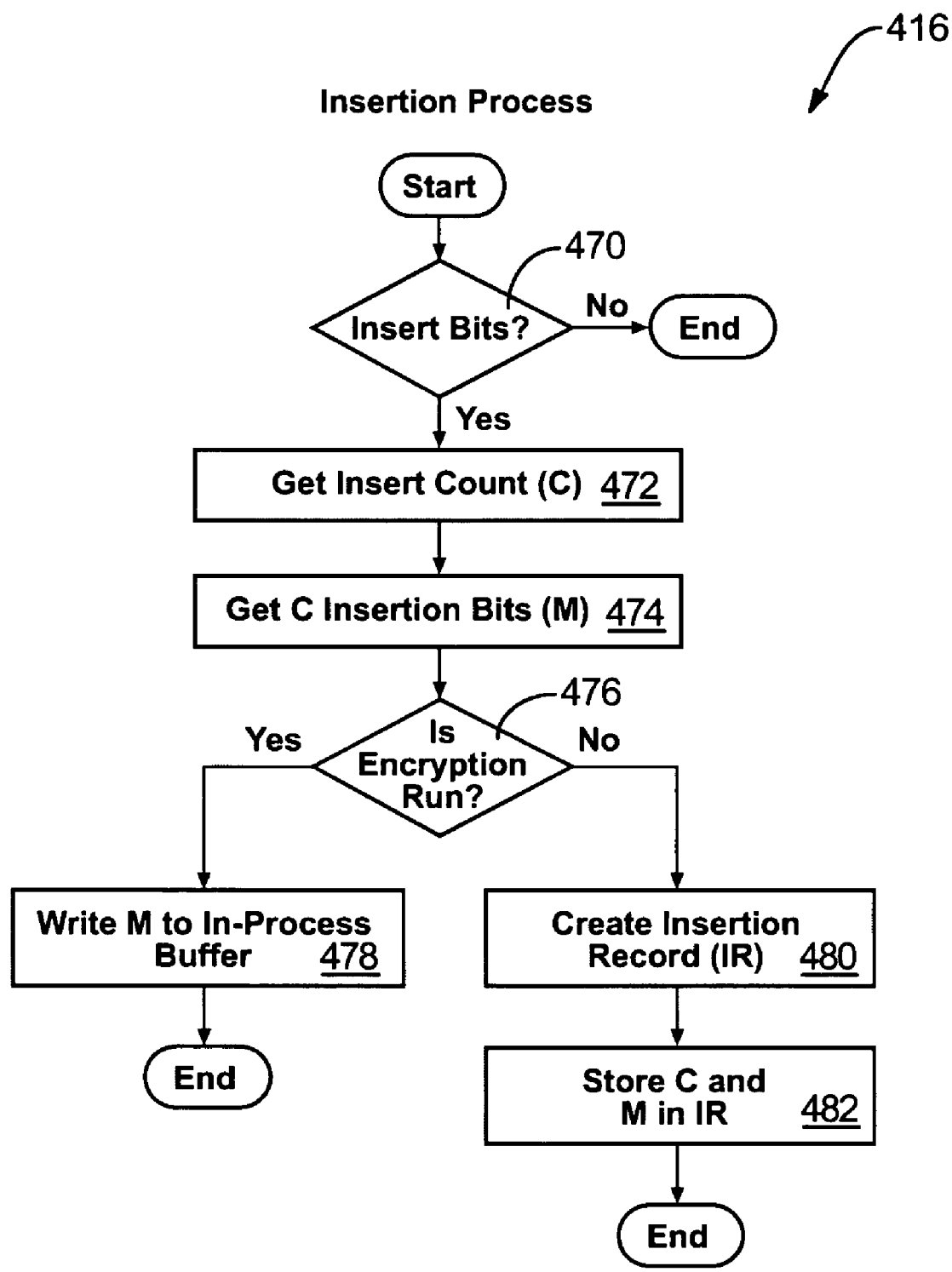
FIG. 22 is a process flow diagram of an insertion process, in accordance with the invention.

Referring to FIG. 22, the insertion process 416 may include evaluating 470 whether or not to insert bits. The evaluating 470 may include executing the decision process 450. If the result of the evaluating step 470 is no, the insertion process 470 ends.

If the result is yes, the insertion process 416 may include getting 474 an insertion count C. C may represent the number of bits to be inserted. The range of possible values of C may be determined by the security level. Where the security level is high C may have a range of high values. Where the security level is low, C may have a range of low values.

For example, for security level 5, the values of C may range from 50 to 100, wheras for a security level of 1, the values of C may range from 5 to 10.

The insertion process 416 may then include getting 474 insertion bits M. The insertion bits M may be output from the Cth RPGM (the RPGM 102 storing patterns 112 of length C), read from the AHBP 200, or obtained from another source of random data.

The process 416 may then include evaluating 476 whether the current execution of the insertion process 416 is part of an encryption run. If it is, the insertion process 416 may include writing the bits M to the in-process buffer 400. The bits M may be written at the beginning of the buffer 400 before the substitute text E, or after the substitute E, or in some other specified position.

If the current execution of the insertion process 416 is not an encryption run, the process 416 may include creating 480 an insertion record (IR). The insertion process 416 may then include storing C and M in the insertion record IR. It will be noted, that in some embodiments of the process 280, the insertion bits may be written to the in-process buffer 400 and not undergo further obfuscation. Accordingly, where the execution of the insertion process 416 is not an encryption run, the steps of creating 480 an insertion record IR and storing 482 C and M therein may be omitted. The insertion process 416 may simply take steps sufficient to cause the inserted bits to be ignored. For example, the insertion process 416 may simply include changing the point in the input buffer 84 from which the next segment T, or subsegment T, will be read, such that the inserted bits are simply ignored. Where the inserted bits are subject to obfuscations functions, the bits M may need to be written to the in-process buffer in order to re-create the obfuscation functions and to undo the obfuscation.

It will also be noted that for the embodiment of the process 280 of FIG. 17B, where the execution is not an encryption run (i.e. is a decryption run) additional bits may need to be read in from the input store 82 into the input buffer, inasmuch as the step 382 of reading a segment into the input buffer may not have taken into account bits that were inserted between segments. Accordingly, additional bits may be read in from the input store such that the string stored in the input store corresponds to the entire encrypted segment including inserted bits.

Figure 23:
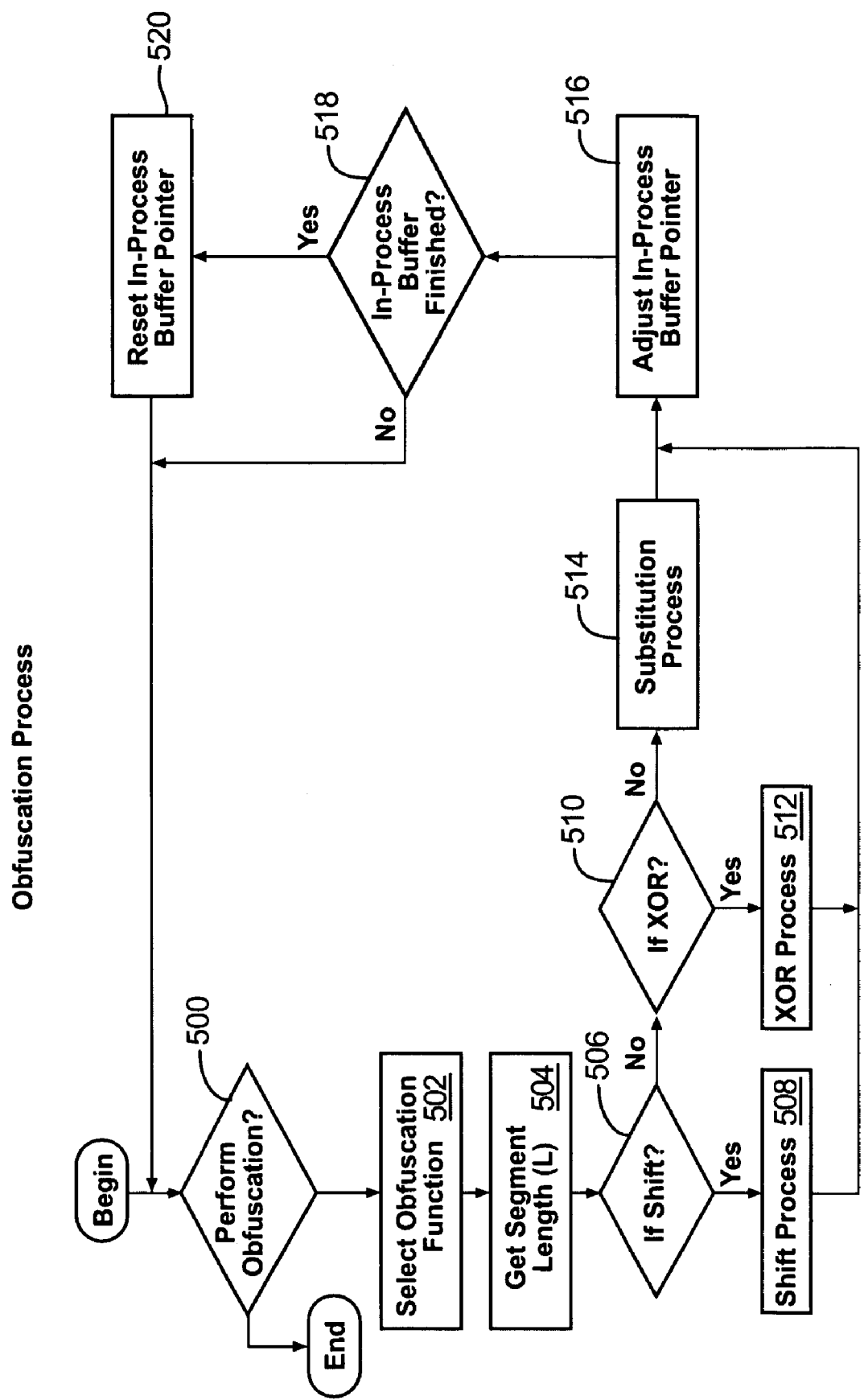
FIG. 23 is a process flow diagram of an obfuscation process, in accordance with the invention.

Referring to FIG. 23, the obfuscation process 418 may include evaluating 500 whether to perform an obfuscation. If the result of the evaluation 500 is yes, the process 418 may include selecting 502 an obfuscation function. The obfuscation process 218 may be repeated so long as the result of the evaluation 500 continues to be yes. The evaluation 500 may be performed by executing the decision process 450.

Selecting 502 an obfuscation function may include retrieving a number from the data source 100, such as an RPGM 102, and comparing the number to specified codes. For example, an output number three may correspond to an exclusive or whereas a two corresponds to a substitution.

The process 418 may include getting 504 a subsegment, or bit pattern, length (L).

L may be a number output from the data source 100 representing the length of the bit pattern 402a-402e that is to be the argument for an obfuscation function. For example, if the in-process buffer contains substitute text E having a length of twenty-nine bits, seven of those bits may be isolated to be the argument of an obfuscation function. Typically, the bits operated upon will be the contiguous bits beginning at the address stored within the in-process buffer pointer 506. For the initial execution of the obfuscation process 418 the in-process buffer pointer 506 may be initialized to the first bit location in the in-process buffer 400.

The process 218 may then include evaluating whether the function selected in step 502 is a shift function. If it is, a shift process 508 may be executed. In a like manner, the process 218 may evaluate 510 whether the function selected in 502 is an exclusive or. If it is, an XOR process 512 may be executed. If the function selected in step 502 is a substitution process, the substitution process 514 may be executed. As a practical matter, evaluating whether the function selected in step 502 is a substitution may be unnecessary, the flow of the process 418 ensures that if step 514 is reached, the function selected is not a shift or exclusive or. It will be noted that other obfuscation functions other than the shift, exclusive or, or substitution may be used. Any reversible process known in the art may be used.

The process 218 may include adjusting 516 the in-process buffer pointer. For example, if an obfuscation is performed on seven bits at the beginning of the in-process buffer, the in-process buffer pointer 406 may be advanced seven positions, such that upon the next iteration of the obfuscation process 418, the bits beginning at the new address stored in the in-process buffer pointer 406 will be operated upon.

The obfuscation process 218 may include evaluating 518 whether the in-process is buffer is finished. "Finished" may connote that the in-process buffer pointer 406 points to a location in the in-process buffer beyond the storage location of the substitute text E in the in-process buffer 400. If the result of the evaluation 518 is yes, the in-process buffer pointer 400 may be reset 520 to the beginning address of the in-process buffer 400.

Figure 24:
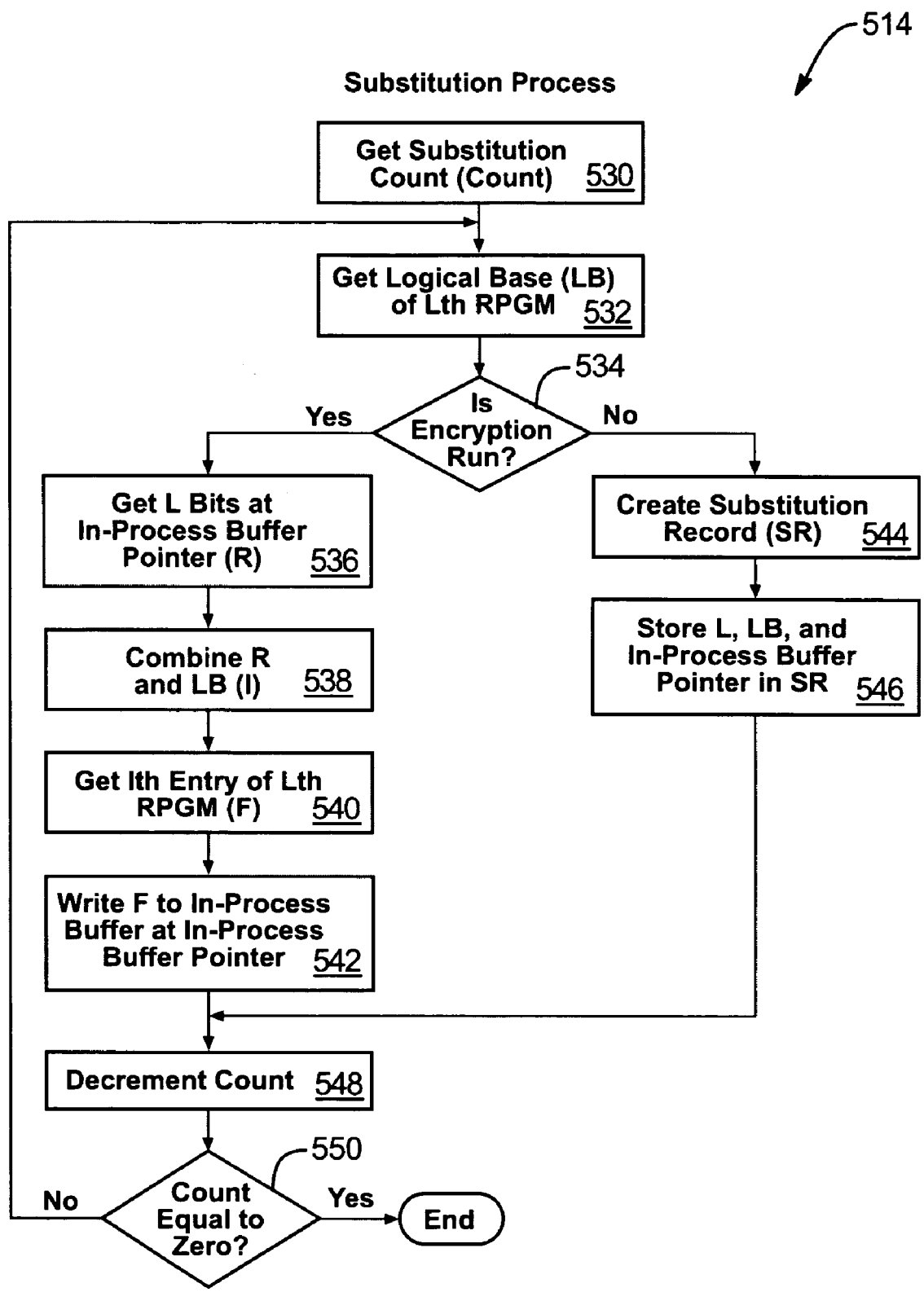
FIG. 24 is a process flow diagram of a substitution process, in accordance with the invention.

Referring to FIG. 24, the substitution process 514 may be embodied as illustrated. The process 514 may include getting 530 a substitution count (count). The count may be used to govern how many times the substitution process will be performed.

In some embodiments, the number of times the substitution process 514 is repeated may be governed by calling the decision process 450 and continuing to repeat the substitution process so long as the decision process 450 returns "yes." In still other embodiments, the substitution process 514 may be iterated only once. Accordingly, getting 530 a count may be omitted.

The process 514 may include getting 532 the logical base (LB) of the Lth RPGM.

It will be noted that L is the length of the bit pattern 402a-402e selected in step 504 of the obfuscation process 418. The Lth RPGM may denote the RPGM 102 containing patterns 112 of length L. In embodiments having multiple RPGMs 102 storing patterns of identical length, the Lth RPGM may represent the RPGM 102 indicated in step 504. That is to say, in such embodiments, outputting the number of bits in step 504 may include outputting a pattern identifying an RPGM and ascertaining the length of patterns stored within the identified RPGM.

The process 514 may include evaluating 534 whether the current execution of the substitution process 514 is part of an encryption run. If it is, the process 514 may include getting L bits (R) from the in-process buffer 400 starting at the bit position pointed to by the in-process buffer pointer 406. The process 514 may include combing R and LB to get an index I. R and LB may be combined by adding R to LB. R and LB may be combined by setting the offset 104 of the Lth RPGM equal to R. The process 514 may include getting the Ith Entry (F) of the Lth RPGM. It will be noted that in some embodiments the Ith entry may be the pattern 112 stored at the index 114 pointed to by the Ith entry of the address table 150. The entry F may be written 542 to the in-process buffer 400 at the address pointed to by the in-process buffer pointer 406.

If the current execution of the substitution process 514 is not an encryption run, the process 514 may include storing sufficient information to enable a substitution to be undone. Accordingly, the substitution process 514 may include creating 544 a substitution record (SR). The process 514

If the current execution of the substitution process 514 is not an encryption run, the process 514 may include storing sufficient information to enable a substitution to be undone. Accordingly, the substitution process 514 may include creating 544 a substitution record (SR). The process 514 may include storing 546 in SR such parameters as L, LB, and the current value of the in-process buffer pointer 406. In some embodiments, the process 514, during a decryption run, may include accessing (e.g outputting a pattern and causing advancement of the logical base 106) the Lth RPGM in order to ensure that the state of the Lth RPGM is changed as it would have been had the current execution been an encryption run. Alternatively, the logical base 106 of the Lth RPGM may simply be advanced as when the Lth RPGM is accessed to output a pattern 112.

The process 514 may include decrementing 548 the variable count and evaluating 550 whether the count is equal to zero. If the value of count is zero, the substitution process 514 may be terminated. If it is greater than zero, the process 514 will be executed again beginning at step 532.

Figure 25:
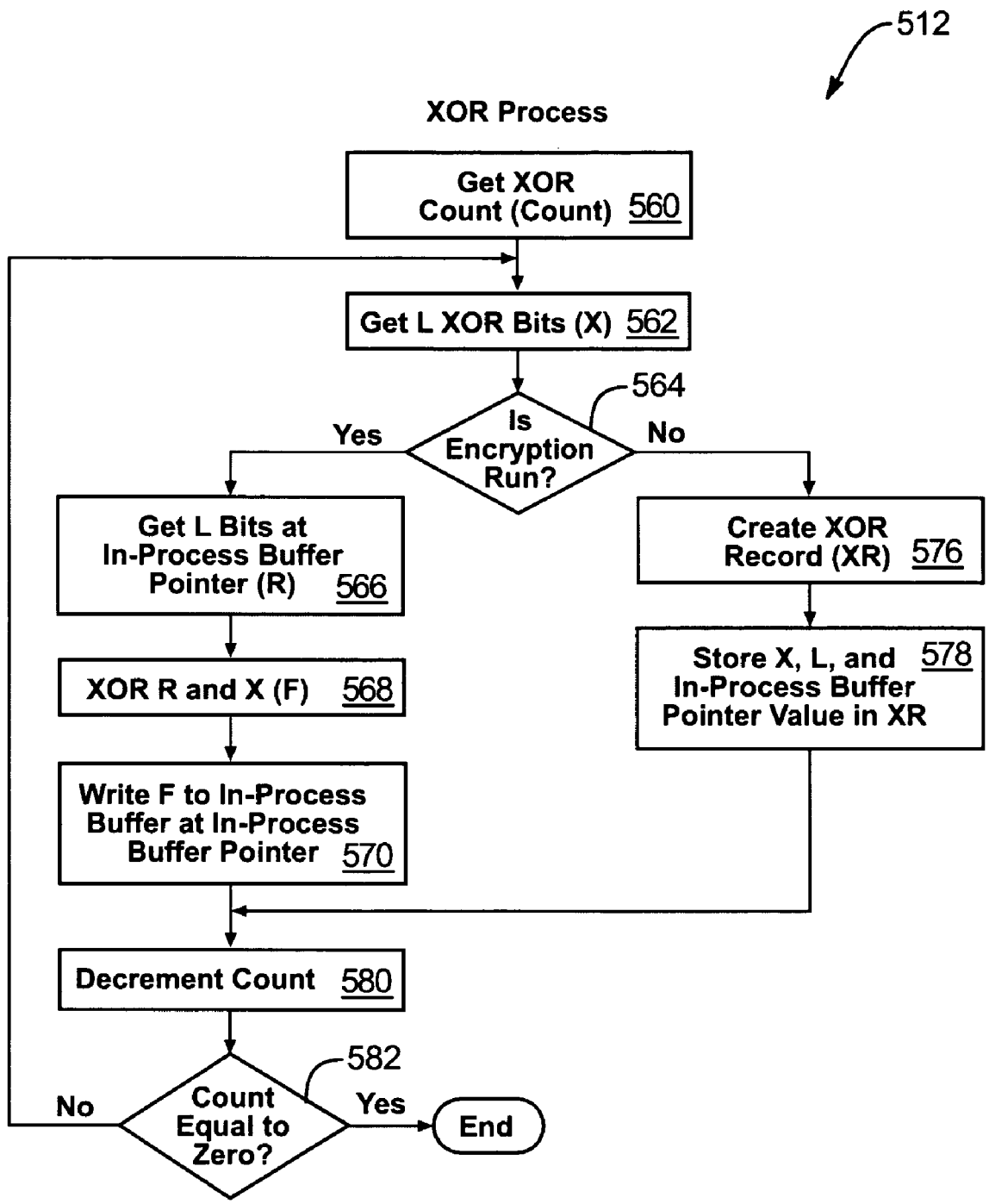
FIG. 25 is a process flow diagram of an XOR process, in accordance with the invention.

Referring to FIG. 25, an XOR process 512 may include getting 560 an XOR count (count). Count may indicate how many times the XOR process 512 is to be repeated. In some embodiments, the XOR process 512 may be performed only once, accordingly, step 560 may be omitted. In some embodiments, the number of times the XOR process 512 is iterated may be determined by performing the decision process 450 and repeating the process 512 so long as the decision process 450 outputs "yes."

The process 512 may include getting 562 L XOR bits (X). X may be output from the data source 100. For example, the Lth RPGM may be accessed to output a pattern of length L. Alternatively, L bits may be read from that AHBP 200.

The process 512 may include evaluating 564 whether the current execution of the process 512 is an encryption run. If the current execution is an encryption run, the process 512 may include getting 566 L bits (R) from the in-process buffer 400 beginning at the location pointed to by the in-process buffer pointer 506. X and R may then be combined 568 using an exclusive to obtain bit pattern F. F may then be written 570 to the in-process buffer 400 beginning at the location pointed to by the in-process buffer pointer 406.

If the current execution of the process 512 is not an encryption run, the process 512 may include creating 576 an XOR record (XR). The process 512 may include storing in XR parameters necessary to undo an exclusive or operation performed during an encryption run. Accordingly, such parameters as X, L, and the current value of the in-process buffer pointer 406 may be stored 578 in XR.

The process 512 may include decrementing 580 count, and evaluating 582 whether count is equal to zero. If so, the process 512 may end. If not, the process 512 may be repeated beginning at step 562.

Figure 26:
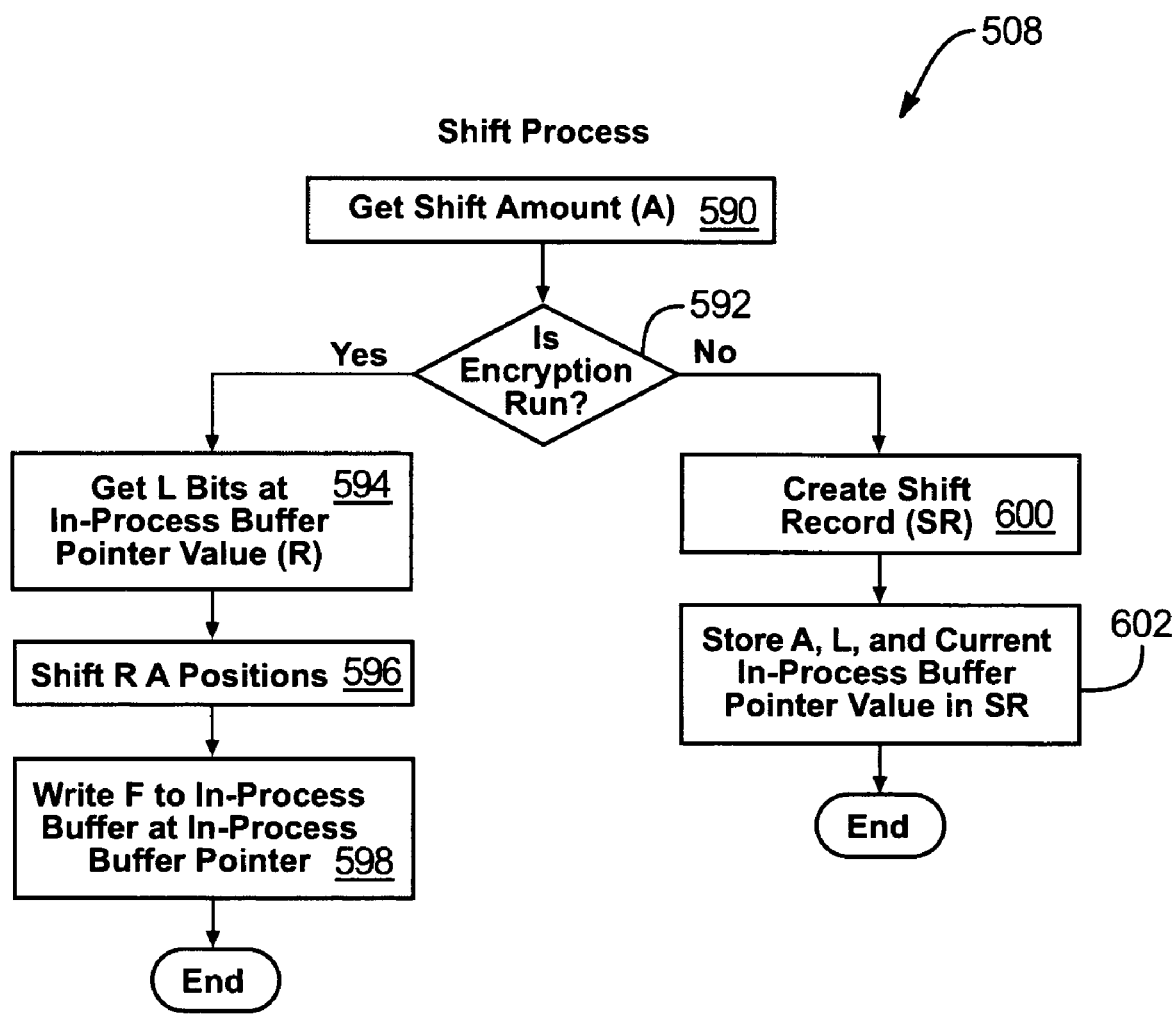
FIG. 26 is a process flow diagram of a shift process, in accordance with the invention.

Referring to FIG. 26, the shift process 508 may include getting 590 a shift amount A. In the illustrated embodiments shifts are presumed to be to the right. In some embodiments a direction may be determined by evaluating a pattern output from the data source 100, accordingly, in such embodiment, the shift process would include ascertaining a shift direction. For decryption runs (not an encryption run) the direction of the shift would be stored to enable recreation of the shift. A may be obtained from the data source 100. For example, an RPGM 102 may be accessed to obtain an amount A. The process 508 may include evaluating whether the current execution of the process 508 is an encryption run. If so, the process 508 may include getting 594 L bits (R) from the in-process buffer 400 beginning at the location pointed to by the in-process buffer pointer 406. The process 508 may include shifting 596 R by A bit positions to obtain shifted bit pattern F. Where the shift amount A is greater than L, the entire contents of the in-process buffer 400 may be shifted to obtain a shifted bit pattern F. Alternatively, the amount A may be divided by L and result used as A during the shifting step 596. The process 508 may include writing 598 F to the in-process buffer 400 beginning at the location pointed to by the in-process buffer pointer 406.

If the current execution of the process 508 is not part of an encryption run, the process 508 may include creating 600 a shift record (SR). The process 508 may include storing parameters necessary to undo a shift operation performed during an encryption run. Accordingly, the process 508 may include storing 602 such parameters as A, L, and the current value of the in-process buffer pointer.

Figure 27:
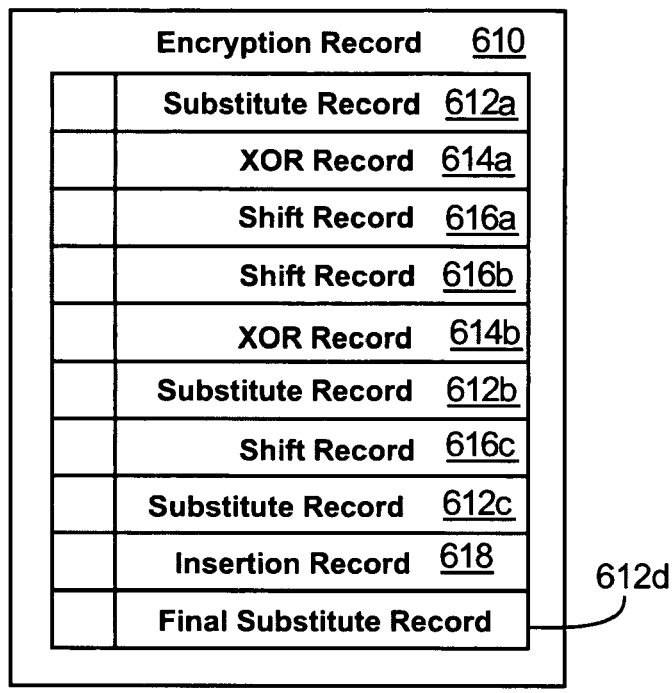
FIG. 27 is a schematic block diagram of an encryption record, in accordance with the invention.

Referring to FIG. 27, during execution of the process 280 to decrypt messages, records of encryption parameters may be stored in an encryption record 610. An encryption record 610 may store parameters necessary to undo all encryption operations performed on a segment (for the process 280 of 17B) or bit pattern or subsegment (for the process 280 of 17A) of clear text. Thus, an encryption record 610 may exist for each segment, or bit pattern, constitution a clear text message. An encryption records may store substation records 612*a*-612*c*, XOR records 614*a*-614*b*, shift records 616*a*-616*c*, insertion records 618, and a final substitution record 612*d*.

Figure 28:
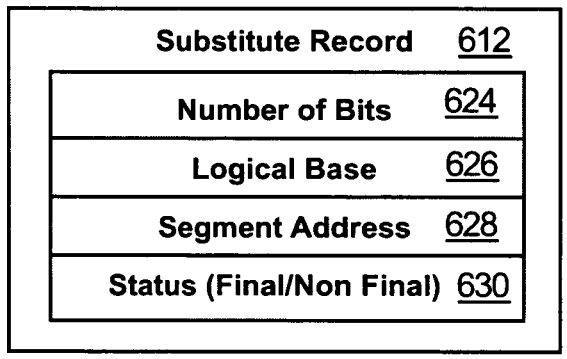
FIG. 28 is a schematic block diagram of a substitution record, in accordance with the invention.

Referring to FIG. 28, a substitution record 612*a*-612*d* may store a bit number 624 indicating the number of bits that were subject to the substitution operation. The substitution record 612*a*-612*d* may store a logical base 626, or other data, indicating the state of the RPGM 102 or other data source 100 accessed for the substitution. The substitution record 612*a*-612*d* may store a bit pattern address 628 indicating a location within the in-process buffer 400 at which the substitution took place during encryption. A substitution record 612*a*-612*d* may store a status 630 indicating whether a particular substitution record 612*a*-612*d* will yield the final clear text.

Figure 29:
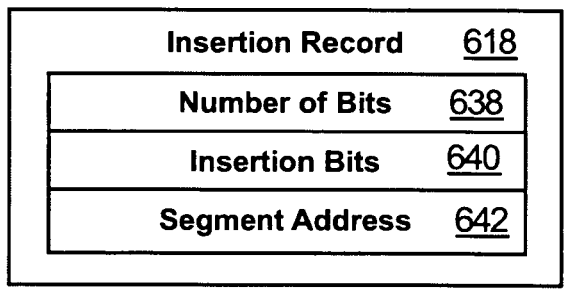
FIG. 29 is a schematic block diagram of an insertion record, in accordance with the invention.

Referring to FIG. 29, an insertion record 618 may likewise include a bit number 638 indicating the number of bits that were inserted. The record 618 may store insertion bits 640 embodied as the bits inserted during an original insertion. The insertion record 618 may store a bit pattern address 642 indicating the location within the in-process buffer 400 where an insertion was made. In some embodiments, bits may always be inserted after the last bit of a substitute bit pattern E. Accordingly, a bit pattern address 642 may be unnecessary to undo an insertion since the location of insertion may be assumed.

Figure 30:
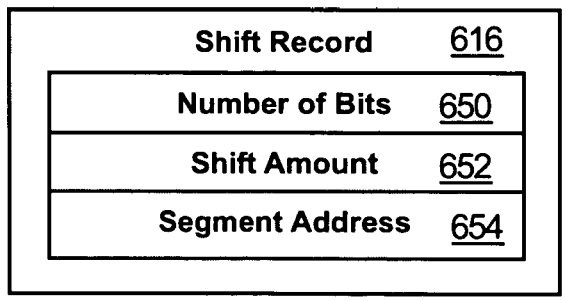
FIG. 30 is a schematic block diagram of a shift record, in accordance with the invention.
Figure 31:
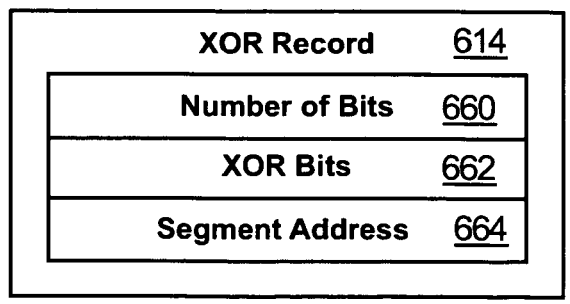
FIG. 31 is a schematic block diagram of an XOR record, in accordance with the invention.

Referring to FIG. 30, a shift record 616*a*-616*c* may likewise store, a bit number 650 indicating the number of bits that were subject to the shift operation. A shift record 616*a*-616*c* may store a bit pattern address 654 indicating a location within the in-process buffer 400 at which a shift took place during encryption. A shift record 616*a*-616*c* may also store the amount 652 by which bits were shifted during encryption. For embodiments, where a shift direction is determined by evaluating a pattern output from the data source 100, a shift record 616*a*-616*c* may store a shift direction, otherwise a shift during encryption may be presumed to have been to the right. Therefore, reversing a shift may be presumed to require a shift to the left Referring to FIG. 31, an XOR record 614*a*, 614*b* may likewise store a bit number 660 indicating the number of bits that were subject to an XOR operation. An XOR record 614*a*, 614*b* may include a bit pattern address 664 indicating a location within the in-process buffer 400 at which the XOR took place during encryption. An XOR record 614*a*, 614*b* may likewise store bits XOR bits 662 used for obfuscation during an original XOR operation.

Figure 32:
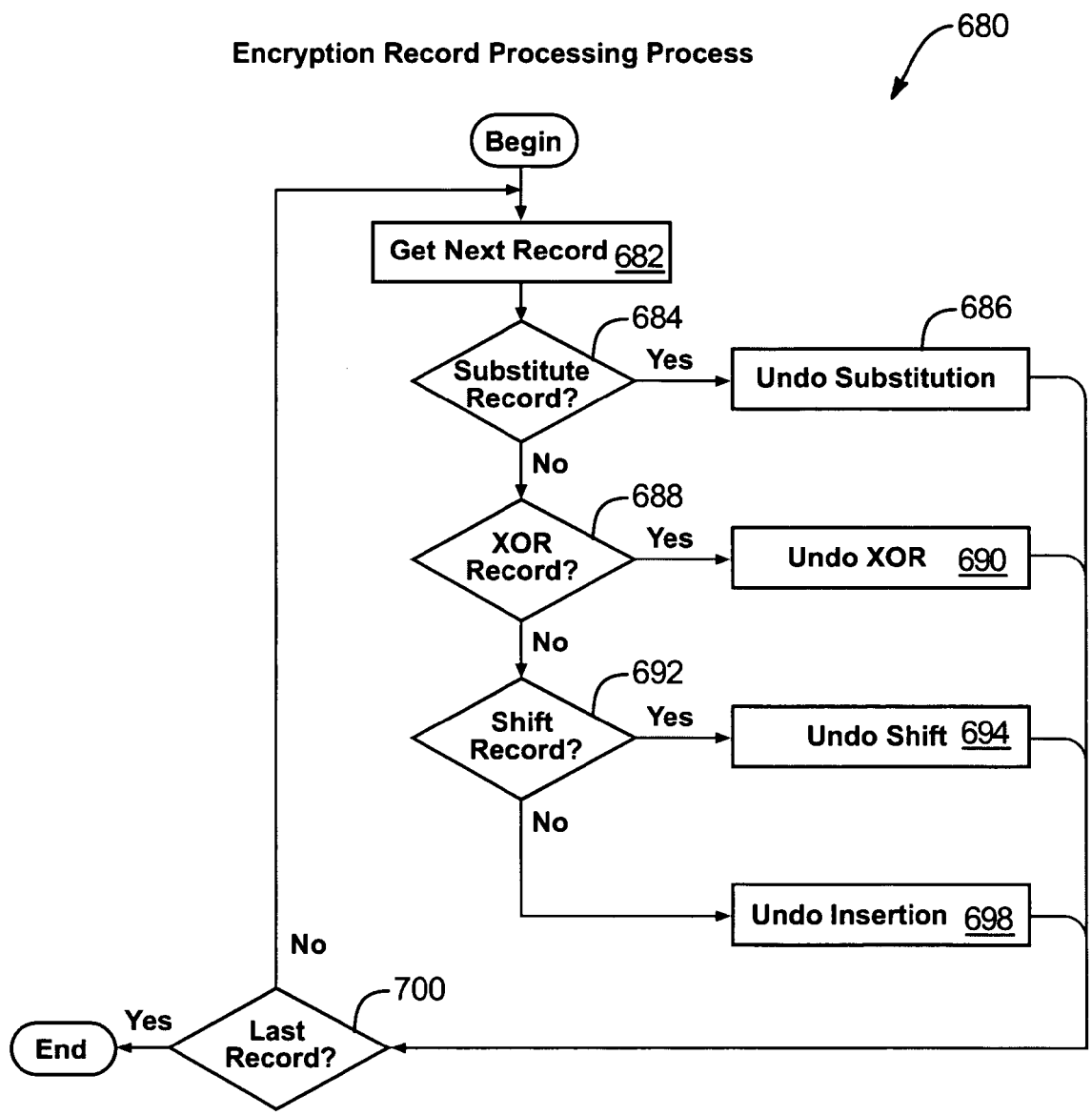
FIG. 32 is a process flow diagram of an encryption record process, in accordance with the invention.

Referring to FIG. 32, an encryption record 610 may be processed according to the encryption record process 680. Process 680 may include getting 682 the next record from the encryption record 610. It will be noted that the records constituting an encryption record 610 will be processed in reverse order. That is to say, the first record created will be the last processed. For example, bit patterns within the in-process buffer may overlap. That is to say, in the embodiment of 17B, substitute bit patterns are substituted for clear text bit patterns. In subsequent steps, bit patterns of potentially differing lengths extracted from the in-process buffer 400, obfuscated, and the obfuscated bits written to the location of the bit pattern. Accordingly, obfuscations must be reversed before the original substitution may be reversed. Therefore, encryption operations stored within an encryption record 610 are processed in reverse order in which they were created The process 680 may include evaluating 684 whether a record is a substitution record. If so, the substitution is undone 686. The process 680 may evaluate 688 whether a record is an XOR record. If so, the XOR is undone 690. The process 680 may evaluate whether a record is a shift record. If so, the shift is undone 694. If a record is neither an XOR, shift, or substitution record, the process 680 may presume that the record is an insertion record and undo 698 the insertion. The process 680 may include evaluating 700 whether the record 612-618 must processed is the last record. If so, the process 680 end, else it repeats for the next record 612-618.

Figure 33:
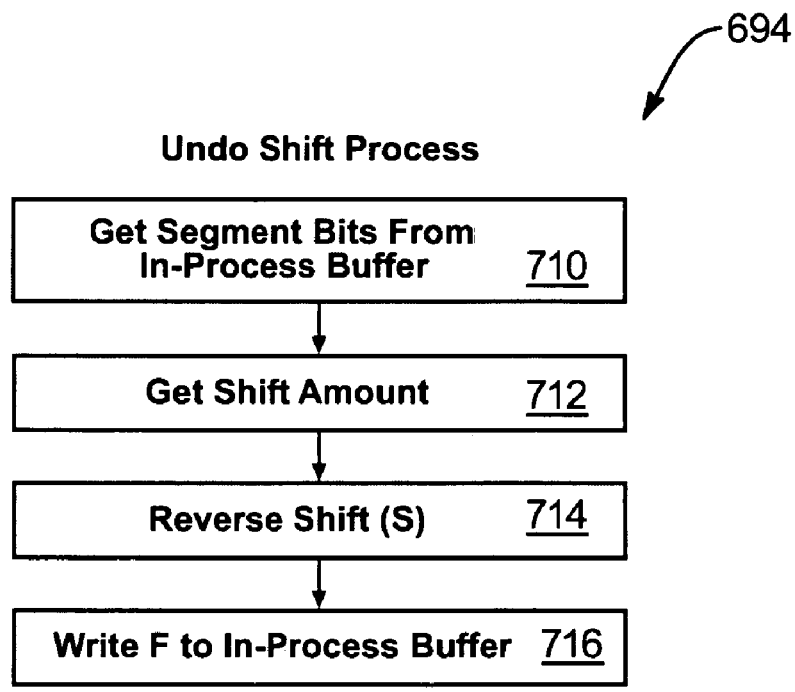
FIG. 33 is a process flow diagram of an undo shift process, in accordance with the invention.

Referring to FIG. 33, undoing 694 a shift may include getting 710 the bits that were shifted during encryption. This may include retrieving the bits indicated in the shift record 616*a*-616*c*. Undoing a shift 694 may include getting 712 the shift amount from the shift record 616*a*-616*c* and reversing 714 the shift. The result F of step 714 may then be written to the in-process buffer 400 at the location indicated in the shift record 616*a*-616*c*. For embodiments where a shift direction is determined by evaluating a pattern output from the data source 100, undoing 694 a shift may also include retrieving a shift direction from a shift record 616*a*-616*c* and reversing the shift in accordance thereto.

Figure 34:
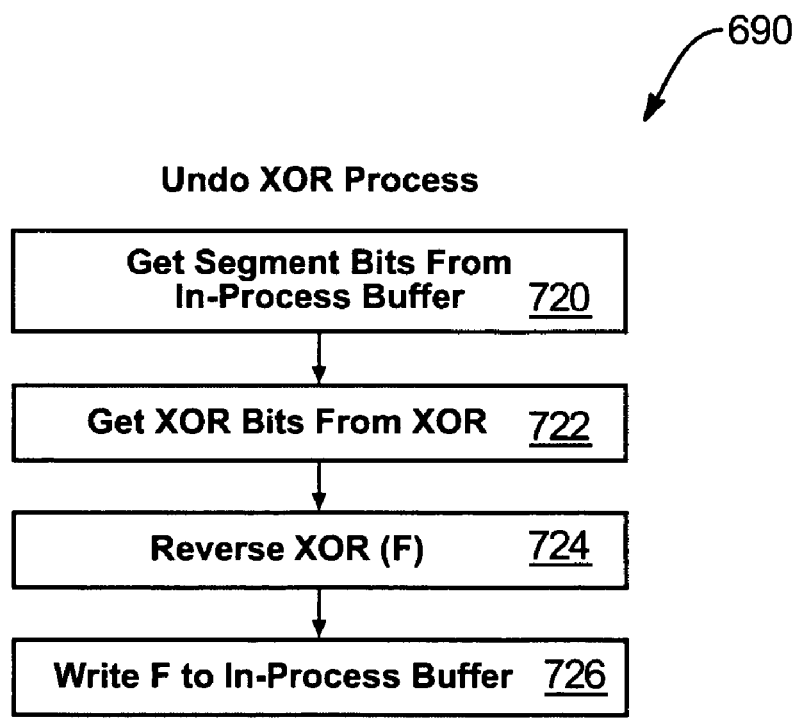
FIG. 34 is a process flow diagram of an undo XOR process, in accordance with the invention.

Referring to FIG. 34, undoing 690 an XOR may include getting 720 the bits indicated in the XOR record 614*a*, 614*b*, getting 722 the XOR bits 662 from the XOR record 614*a*, 614*b*, and reversing 724 the XOR to obtain result F. The result F of reversing the XOR may be written 726 to the in-process buffer 400 at the location indicated in the XOR record 614*a*, 614*b*.

Figure 35:
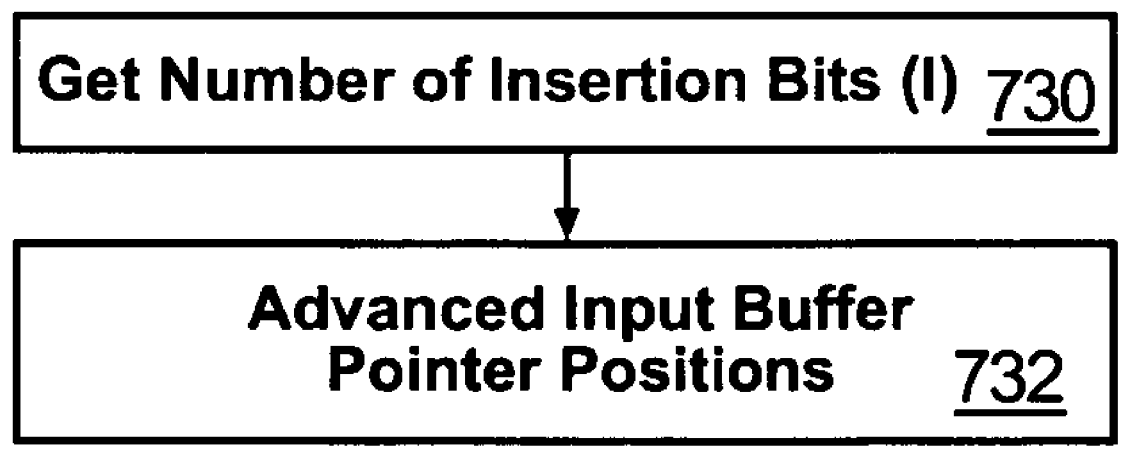
FIG. 35 is a process flow diagram of an undo insertion process, in accordance with the invention.
Figure 36:
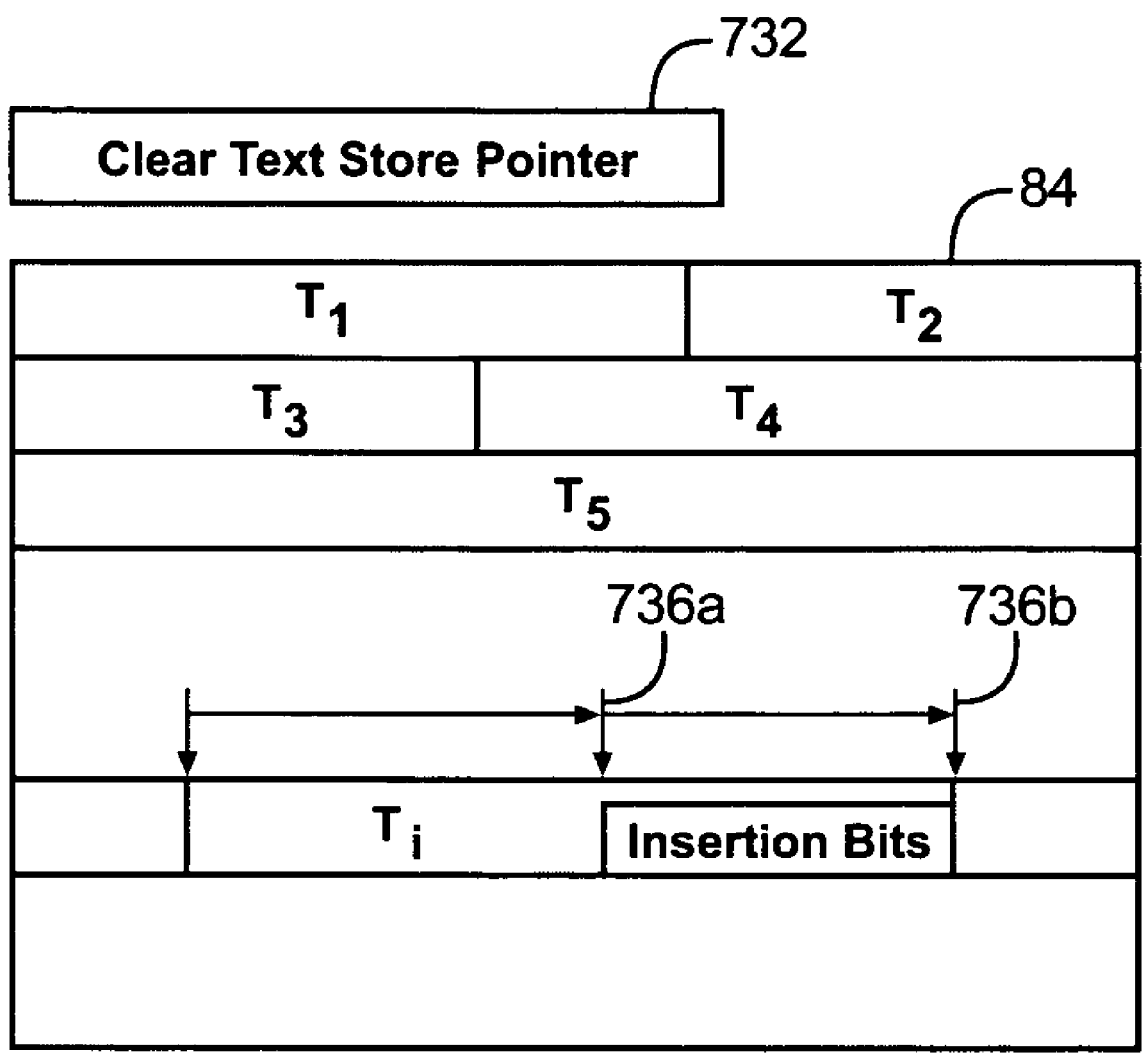
FIG. 36 is a schematic block diagram of an input buffer, in accordance with the invention.

Referring to FIGS. 35 and 36, undoing 698 an insertion may include ignoring the inserted bits. For example, undoing may include getting 730 the number of bits inserted from the insertion record 618. An input buffer pointer 732 may indicate the position from which a next bit pattern of encrypted text is to be read in the next iteration of the process 280. Accordingly, undoing 698 an insertion may include advancing 734 the input buffer pointer 732 from position 736*a* to position 736*b* such that the inserted bits are ignored.

In some embodiments, the insertion bits may be included in the substitute text being processed during the obfuscation process 418. Accordingly, undoing an insertion may require removing the inserted bits from the in-process buffer (removing the bits and shifting other data to close the gap). Alternatively, where the bits inserted are at the end of the in-process buffer 400, the last X bits of the buffer may be ignored in subsequent undoing operations, where X is the number of inserted bits.

Figure 37:
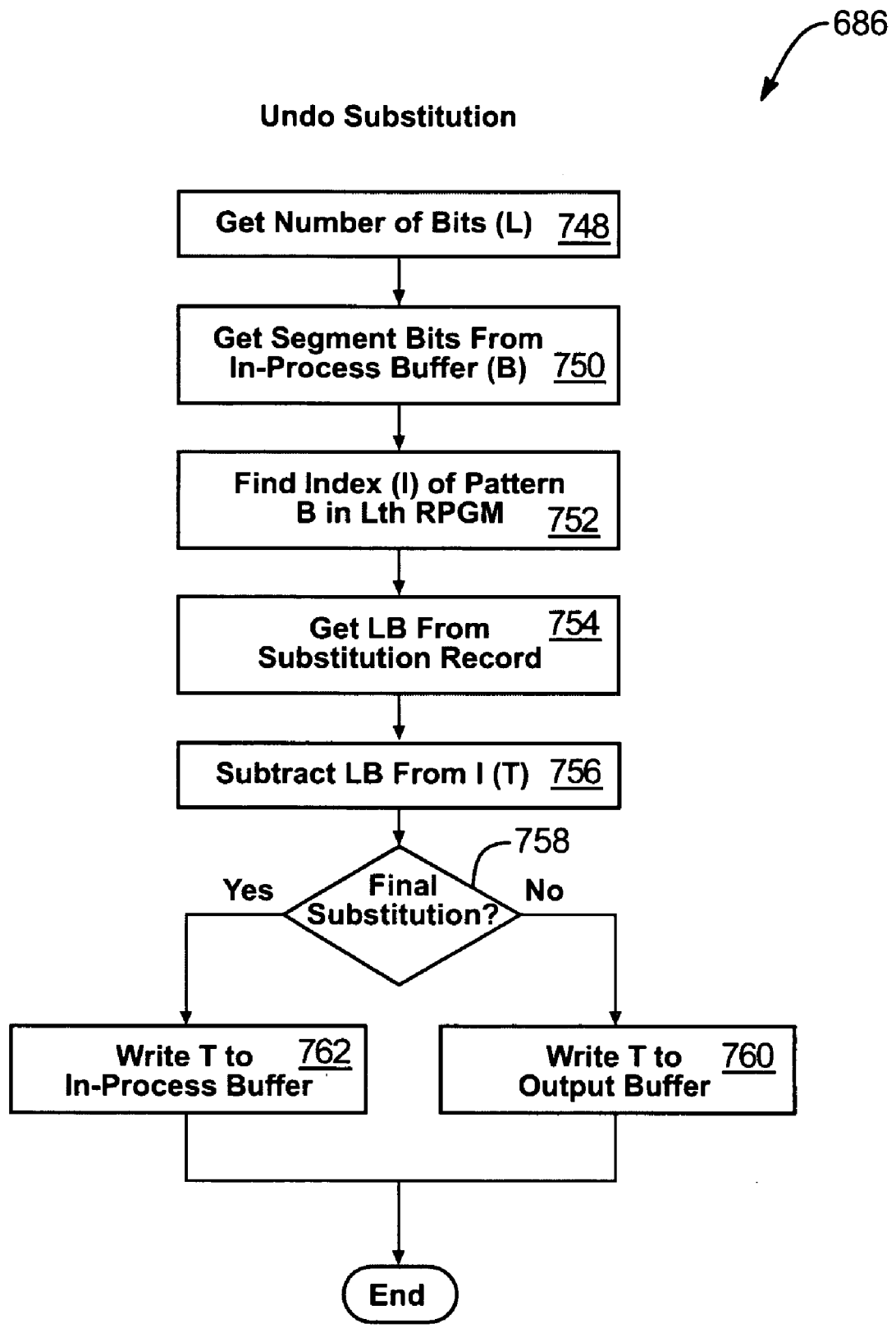
FIG. 37 is a process flow diagram of an undo substitution process, in accordance with the invention.

Referring to FIG. 37, undoing 686 a substitution may include getting 748 the number of bits L involved in the substitution from the substitution record 612*a*-612*d*. undoing 686 a substitution may include getting 750 from the in-process buffer 400 the bits identified in the substitution record 612*a*-612*d*. Undoing 686 may include finding 752 the index (I) of the pattern (B) of the Lth RPGM equal to the bits obtained from the in-process buffer 400. In order to facilitate locating the pattern B within the pattern table 108, a table may be prepared ordering the patterns 112 sequentially with each pattern 112 mapped to its corresponding index 114 in the table 108. Thus, the pattern from step 750 may be more readily located and the index I identified.

Undoing 686 may include getting the logical base (LB) stored in the substitution record 612a-612d. I, LB, and the bits retrieved in step 750 may then be analyzed to determine the value of the offset 104 of the Lth RPGM that would yield the bits retrieved in step 750. For example, during encryption, the clear text and the logical base LB were added together to get I. Accordingly, LB may be subtracted 756 from I. The result of the subtraction may be converted to a bit pattern and stored as value T.

Undoing 686 may include evaluating whether the substitution record 612a-612d is a final substitution record 612d. If so, value T may be written 760 to the output buffer 324. If not, the value T may be written 762 to the in-process buffer 400.

Figure 38:
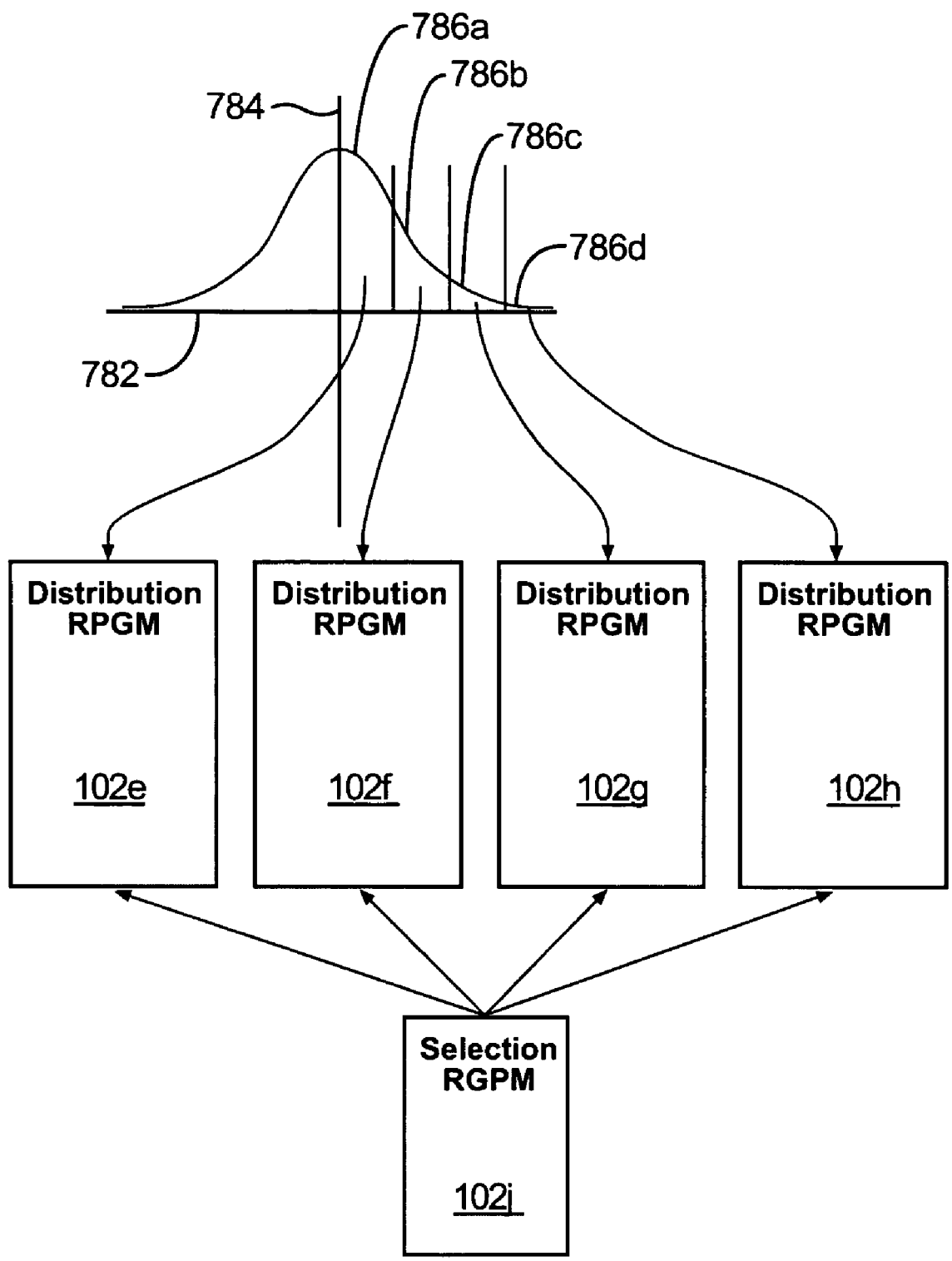
FIG. 38 is a schematic block diagram of a series of RPGMs for outputting random numbers having a specified distribution, in accordance with the invention.
Figure 39:
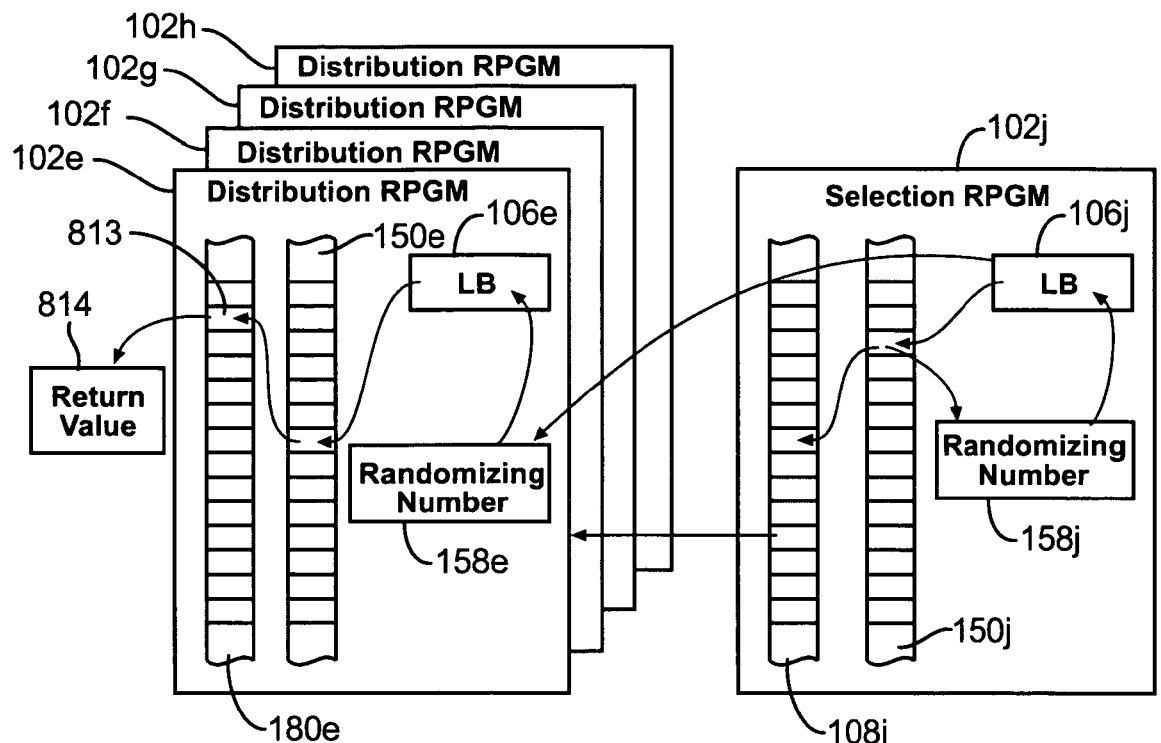
FIG. 39 is a second schematic block diagram of a series of RPGMs for outputting random numbers having a specified distribution, in accordance with the invention.

Referring to FIGS. 38 and 39, a data source 100 may be used to generate series of patterns having an arbitrary distribution. For example, a data source 100 may generate patterns having a Gaussian distribution 780. Other distributions are possible including a Poisson, or any other arbitrary distribution desired. A distribution 780 may be represented graphically as illustrated with the horizontal axis 782 representing the range of possible values, and the vertical axis 784 representing the frequency with which any given value occurs. The distribution 780 may be divided into regions 786, such as regions 786a-786d. Where the distribution is symmetrical, only those regions 782 to one side of an axis of symmetry need be considered.

Each region 786a-786d may be assigned to an RPGM 102e-102h. The pattern tables 108 of the RPGMs 102e-102h may store series of patterns having a distribution equal, or substantially equal, to its corresponding region 786a-786d. For example, the distribution 780 may be divided into regions each corresponding to a standard deviation from a mean value. Accordingly the pattern tables 108 for the RPGMs 102e-102h having a Gaussian distribution with a mean at 655 and a standard deviation of 25 may be represented as illustrated in Table 1. The patterns stored in the pattern tables 108 of the RPGMs 102e-102h may be arranged randomly

TABLE 1

Pattern Table Entries.

| 102e (Std. Deviation 1) | | 102f (Std. Deviation 2) | | 102g (Std. Deviation 3) | | 102h (Tail) | |
|---|---|---|---|---|---|---|---|
| Value | Number of Entries | Value | Number of Entries | Value | Number of Entries | Value | Number of Entries |
| 1 | 177 | 27 | 91 | 53 | 19 | 80 | 2 |
| 2 | 174 | 30 | 81 | 55 | 17 | 81 | 2 |
| 5 | 161 | 31 | 77 | 57 | 15 | 88 | 1 |
| 9 | 151 | 33 | 70 | 60 | 12 | 89 | 1 |
| 13 | 138 | 34 | 66 | 62 | 10 | | Total: 6 |
| 15 | 130 | 37 | 56 | 66 | 7 | | |
| 18 | 120 | 40 | 44 | 68 | 6 | | |
| 21 | 110 | 45 | 31 | 70 | 5 | | |

TABLE 1-continued

Pattern Table Entries.

| 102e (Std. Deviation 1) | | 102f (Std. Deviation 2) | | 102g (Std. Deviation 3) | | 102h (Tail) | |
|---|---|---|---|---|---|---|---|
| Value | Number of Entries | Value | Number of Entries | Value | Number of Entries | Value | Number of Entries |
| 23 | 103 | 50 | 24 | 75 | 3 | | |
| 25 | 96 | | Total: | | Total: | | |
| | Total: 1360 | | 540 | | 94 | | |

The address tables 150 of the RPGMs 102e-102h may have a total number of entries corresponding to the total number of entries in the pattern table 108. The address table may contain the values ranging from one to the total number of entries ordered randomly. For example, RPGM 102e may contain values one through 1360 ordered randomly and RPGM 102h will contain values one through six ordered randomly.

An access control RPGM 102j may be used to determine which RPGM 102e-102h will be selected to return a bit pattern. The pattern table 108 of access control RPGM 102j may store patterns identifying the RPGMs 102e-102h. For example each RPGM 102e-102h may have a code assigned thereto and the pattern table 108 may store such codes. The number of times a particular code is stored in the pattern table 108 of RPGM 102j may correspond to the number of entries in the pattern table 108 of a particular RPGM 102e-102h. Thus, a code corresponding to RPGM 102e will occur 1360 times, whereas a code corresponding to RPGM 102h will occur only six times. The codes may be arranged randomly within the pattern table 108 of the RPGM 102j. In this manner, for the illustrated distribution, the probability of RPGM 102e being called is 1360/2000, the probability of RPGM 102f being called is 540 out of 2000, the probability of RPGM 102g being called is 94, and the probability of RPGM 102h being called is 106/2000

The address table 150 of the RPGM 102j may store values from one to the total number of values stored in all RPGMs 102e-102h. Thus, for the illustrated distribution with a standard deviation of twenty-five, the address table 150 of RPGM 102j will store is 2000 values from one to 2000 ordered randomly.

Figure 40:
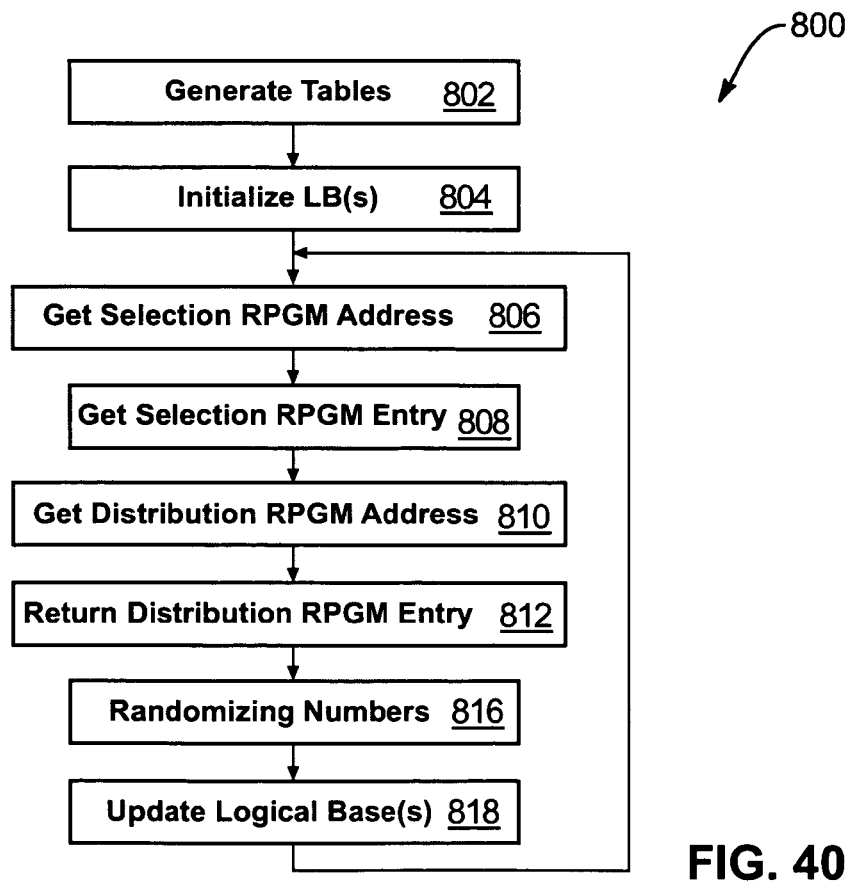
FIG. 40 is a process flow diagram of a random pattern return process, in accordance with the invention.

Referring to FIG. 40, while still referring to FIG. 39, the RPGMs 102e-102j may be used to implement a random pattern return process 800. The random pattern return process 800 may include generating 802 tables. The tables generated 800 may include the pattern tables 108 and address tables 150 of the RPGMs 102e-102j containing values as described hereinabove. The randomization of the entries of the pattern tables 108 and address tables 150 may be accomplished by any method known in the art for randomizing number.

The random pattern return process 800 may include initializing 804 the logical bases 106 of the RPGMs 102e-102j the values may be determined randomly or simply initialized to zero. The random pattern return process 800 may include getting 806 a selection RPGM address. Getting 806 a selection RPGM address may include returning the value stored at location 807 within the address table of the selection RPGM 102*j* pointed to by the logical base 106 of RPGM 102*j*.

The random pattern return process 800 may include getting 808 a selection RPGM entry. Getting 808 a selection RPGM entry may include getting the value from the pattern table 108 of RPGM 102*j* stored at the location 809 pointed to by the address retrieved in step 806. The value retrieved in step 808 may represent a code or other value identifying a specific RPGM 102*e*-102*j*.

The random pattern return process 800 may include getting 810 a distribution RPGM address. Getting 810 a distribution RPGM address may include retrieving the value stored in the address table 1500 at the location 811 pointed to by the logical base is 106 of the RPGM 102*e*-102*h* selected in step 808. Thus if RPGM 102*h* were selected in step 808, the value stored in the address table 150 of RPGM 102*h* at the address stored in the logical base 106 would be retrieved.

The random pattern return process 800 may include returning 812 a distribution RPGM entry. Returning 812 a distribution RPGM entry may include returning the pattern 814 stored at the location 813 pointed to by the address retrieved in step 810. The pattern 814 may be returned to any calling function, process, or application making use of random numbers. Returning 812 a distribution RPGM entry may also include combining the pattern 814 with a mean. Combining a pattern 814 with the mean may include determining whether the pattern 814 is to be subtracted or added to the mean. For example, where the distribution is symmetrical, only one side of the distribution need by represented by the RPGMs 102*e*-102*h*. However, upon returning a pattern 814, the pattern 814 must be adjusted to ensure that in a series of returned values 814, the values 814 returned will fall with equal probability on either side of the axis of symmetry.

The method for combing the pattern 814 with a mean could be based on whether the logical base 106 of the RPGM 102*e*-102*h* from which it was returned is even or odd.

For example, the first time RPGM 102*e* is accessed to return a pattern 814, whether the logical base of RPGM 102*e* is even or odd may be stored. The first time RPGM 102*e* is called the pattern 814 may be added to the mean. The second time RPGM 102*e* is called, the status of the logical base 106 during the second call is also stored. The second time RPGM 102*e* is called the pattern 814 is subtracted from the mean. The third time RPGM 102*e* is called, the status of the logical base 106 stored for the first call may be examined, if the logical base 106 was odd, the pattern 814 is added, if it was even, the pattern 814 is subtracted from the mean. The fourth time RPGM 102*e* is called, the status of the logical base stored the second time the RPGM 102*e* was called may determine whether the pattern 814 is added or subtracted, and so forth for the fifth, sixth, and any additional calls to RPGM 102*e*.

The random pattern return process 800 may include updating 816 the randomizing numbers 158 of the RPGMs 102*e*-102*j*. In some embodiments, updating 816 the randomizing numbers 158 may include adding the logical base 106 of the selection RPGM 102*j* to the randomizing numbers 158 of the distribution RPGMs 102*e*-102*h*.

Updating 816 the randomizing number 158 of the selection RPGM 102*j* may include adding the value at location 807 thereto. Updating 816 the randomizing numbers 158 of the RPGMs 102*e*-102*j* may also include ensuring that the randomizing number 158 of a particular RPGM 102*e*-102*j* is less than or equal to the total number of entries in the pattern table 108 of that RPGM. For example, the randomizing number 158 of distribution RPGM 102*g* may be divided by the total number of values in the pattern table 108 of RPGM 102*g* and the remainder stored as the new randomizing number 158.

The random pattern return process may include updating 816 the logical bases 106 of the RPGMs 102*e*-102*j*. In some embodiments, updating 816 a logical base 106 may include adding its corresponding randomizing number 158 and storing the result as the new logical base 106. For example, the logical base 106 of RPGM 102*e* may be added to the randomizing number 158 of RPGM 102*e* and the result stored as the new value of the logical base 106. Where the new value of a logical base 106 is larger than the total number of entries in the pattern table 108 corresponding thereto, the logical base may be divided by the total number of entries and the result stored as the new value for the logical base.

Figure 41:
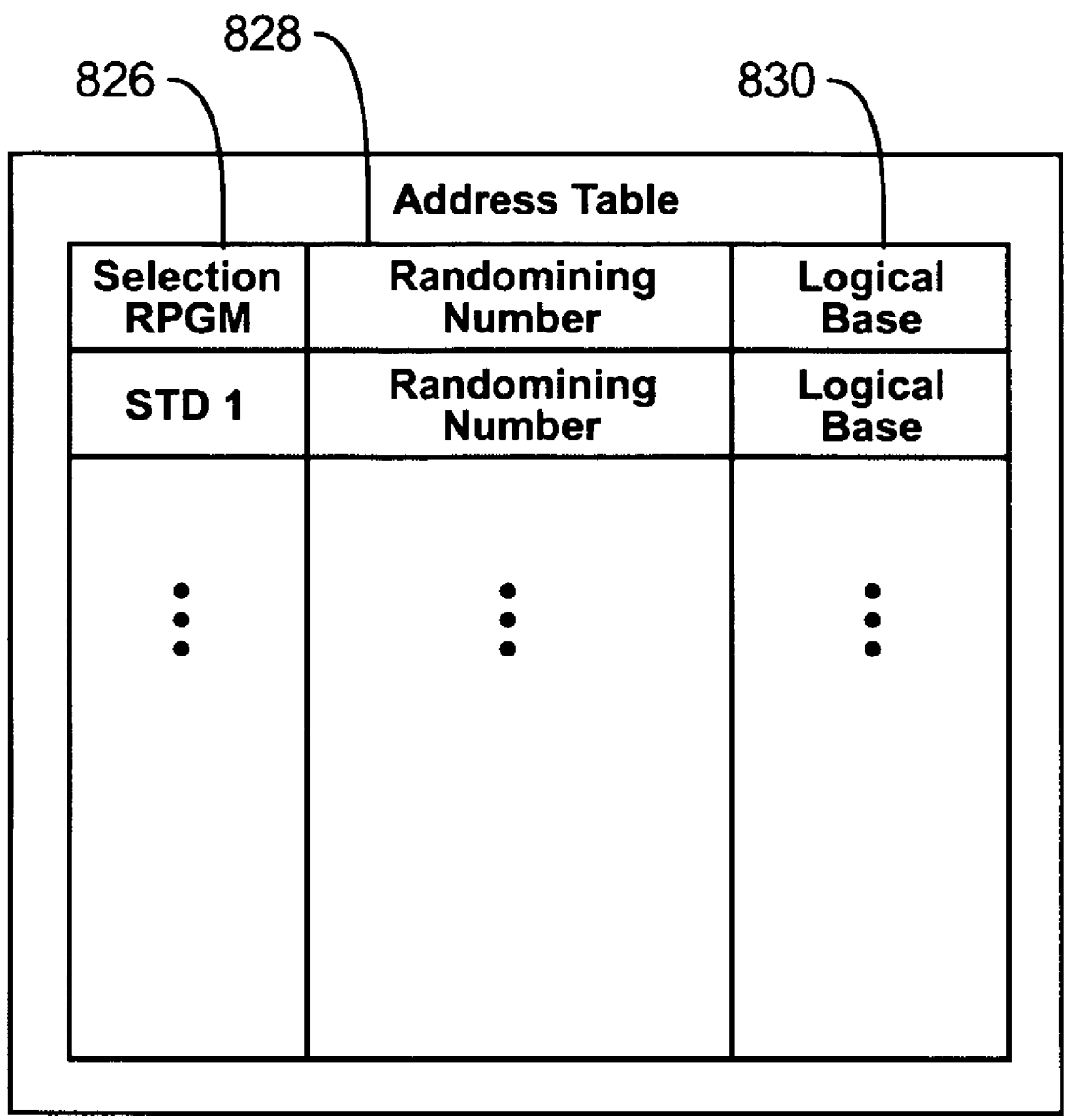
FIG. 41 is a schematic block diagram of an address table, in accordance with the invention.

Referring to FIG. 41, during periods where the RPGMs 102*e*-102*j* are not in use, values describing the current states of the RPGMs 102*e*-102*j* may be stored in an address table. For example, the table may store an identifier 826 for each RPGM 102*e*-102*j* as well as the current value 828 of its randomizing number 158 and the current value 830 of its logical base 106.

The present invention may be embodied in other specific forms without departing from its spirit or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A method for encrypting data to be transported between computers, the method comprising:
   providing a computer system comprising at least one processor and at least one computer-readable medium operably connected to the at least one processor, the at least one computer-readable memory comprising an input store and an output store;
   providing a random number data source running on the at least one processor;
   inputting initialization parameters to the random number data source; and
   executing, by the computer system, a substitution process comprising
   outputting a byte length from the random number data source,
   reading, after the outputting, an input sting from the input store having a length equal to the byte length,
   inputting, after the reading, the input string as an offset to the random number data source,
   outputting, after the inputting, a cipher string from the random number data source having a length equal to the length of the input string, and
   writing, after the outputting, the cipher string to the output store.

2. The method of claim 1, wherein the computer system further comprises an in-process buffer.

3. The method of claim 2, further comprising
   writing, by the computer system, die cipher string to the in-process buffer providing a test pattern and a determination pattern; and
   performing, by the computer system, an obfuscation operation on. the cipher string if a first test conditioh exists, the first test condition being equality of the test pattern to a pardon of the determination pattern.

4. The method of claim 3, further comprising:
outputting an obfuscation code from the random number data source; and
wherein performing the obfuscation operation compiises performing a manipulation corresponding to the obfuscation code.

5. The method of claim 4, further comprising:
outputting an obfuscation length from the random number data source; and
wherein performing the obfuscation operation further comprises performing the manipulation on a portion of the cipher string having a length corresponding to the obfuscation length.

6. The method of claim 5, wherein the manipulation is at least one of an exclusive or, a shift, and a substitution.

7. The method of claim 6, further comprising:
repeatedly resetting the test pattern and the determination pattern; and
repeatedly performing the obfuscation operation if the first test condition continues to exist.

8. The method of claim 7, further comprising inserting an insertion pattern if a second test condition exists.

9. The method of claim 8, wherein inserting an insertion pattern further comprises resetting the test pattern and the determination pattern; and
wherein the second test condition is the equality of the test pattern and a portion of the determination pattern.

10. The method of claim 9, wherein the random number data source comprises a random pattern generation machine.

11. The method of claim 10, wherein the random number data source comprises a plurality of random pattern generation machines and an aggregate heterogeneous bit pattern.

12. The method of claim 10, further comprising outputting a pattern from the random pattern generation machine, wherein the random pattern generation machine comprises a pattern table and a logical base and outputting the pattern comprises outputting a pattern from the pattern table corresponding to the logical base and advancing the logical base.

13. The metAod of claim 12, wherein advancing the logical base comprises modifying a current value according to a rule to obtain a result and storing the result as the logical base.

14. The method of claim 13, wherein:
the plurality of random pattern generation machines comprises a selection random pattern generation machine and a plurality of cipher random pattern generation machines;
outputting the byte length further comprises outputting a selection pattern from the selection random pattern generation machine, the selection pattern corresponding to a first cipher random pattern generation machine of the plurality of cipher random pattern generation machines; and
outputting the cipher string further comprises outputting a pattern from the first cipher random pattern generation machine.

15. The method of claim 14, wherein the selection random pattern generation machine is also a cipher random pattern generation machine.

16. A method for encrypting data, the method comprising:
storing on a computer a data source having a logical base and an offset;
setting the logical base equal to an initial value; and
executing, by the computer, an encryption processes to encrypt clear test, the encryption process comprising
executing a substitution process comprising
selecting a segment length,
reading, after the selecting, a segment comprising a portion of the clear text having the segment length,
setting, after the reading, the offset equal to a value corresponding to the segment,
outputting, after the setting, a cipher pattern from the first data source,
writing, after the outputting, the cipher pattern to an output buffer, and
advancing, after the outputting, the logical base; and
repeating the substitution process until the clear text segment has been encrypted in its entirety.

* * * * *